US006782005B1

(12) United States Patent
Matsumoto et al.

(10) Patent No.: US 6,782,005 B1
(45) Date of Patent: Aug. 24, 2004

(54) COMMUNICATION SYSTEM AND COMMUNICATION METHOD

(75) Inventors: Wataru Matsumoto, Tokyo (JP);
Hidenobu Fukushima, Tokyo (JP);
Masafumi Narikawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/509,717

(22) PCT Filed: Jun. 4, 1999

(86) PCT No.: PCT/JP99/02991

§ 371 (c)(1),
(2), (4) Date: May 10, 2000

(87) PCT Pub. No.: WO00/07342

PCT Pub. Date: Feb. 10, 2000

(30) Foreign Application Priority Data

Jul. 31, 1998 (JP) .......................................... 10/217120
Aug. 20, 1998 (JP) .......................................... 10/234544
Sep. 9, 1998 (JP) .......................................... 10/309571

(51) Int. Cl.[7] ................................................ H04J 3/16
(52) U.S. Cl. ....................... 370/468; 370/473; 370/493; 370/494; 370/495; 370/498
(58) Field of Search .................................. 370/276, 280, 370/286, 289, 294, 297, 437, 465, 468, 471, 493, 498, 508, 516, 517, 519, 329, 345, 352–354, 473, 494, 495; 375/260, 265, 220, 240

(56) References Cited

U.S. PATENT DOCUMENTS 6,233,251 B1 * 5/2001 Kurobe et al. .............. 370/471

OTHER PUBLICATIONS

Sasaki, ITU, 25 pages (1998).

Hamaguchi et al., IEICE, vol. 96, No. 354, pp. 51–56 (1996).

Okado et al., IEICE, p. 403 (1998).

* cited by examiner

Primary Examiner—Phirin Sam
(74) Attorney, Agent, or Firm—Birch, Stewart, Kolasch & Birch, LLP

(57) ABSTRACT

In the communication system which performs the data communication by the discrete multi-tone modem scheme between a plurality of data communication units using the time-division half-duplex communication function, the ratio between the data transmission time suitable for data communication and the quasi-data transmission time dynamically changes within one period. Further, bits are assigned in such a manner that the data of one period can be transmitted during the data transmission time of that period. Dummy bits are assigned to the portions of the data transmission time to which the data to be transmitted has not been assigned.

23 Claims, 22 Drawing Sheets

FIG.7

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Reserved for future use |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

FIG.8

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Low payload transfer delay mode |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

COMMUNICATION SYSTEM AND COMMUNICATION METHOD

This application is the national phase under 35 U.S.C. §371 of PCT International Application No. PCT/JP99/02991 which has an International filing date of Jun. 4, 1999, which designated the United States of America.

TECHNICAL FIELD

The present invention relates to a communication system and a communication method for performing data communication of discrete multi-tone modem type between a plurality of data communication units through a telephone line.

BACKGROUND ART

In recent years, the xDSL communication system including the ADSL (Asymmetric Digital Subscriber Line) communication system, the HDSL (High-bit-rate Digital Subscriber Line) communication system and the SDSL communication system for performing a high-speed digital communication of several mega bits per second using the existing telephone copper cable have been closely watched. The xDSL communication system is called the DMT (Discrete Multi-Tone) modem system. This system is standardized in T1.413, etc. of ANSI.

This digital communication system, especially in the case where the xDSL transmission path and the ISDN transmission path of the half-duplex ISDN communication system are bound together as an aggregated line or otherwise placed adjacently to each other, poses the problem that the XDSL communication through the xDSL transmission path is affected by interference noises from the ISDN transmission path or other lines and decreases in speed. For solving this problem, various techniques are used.

FIG. 12 shows the interference noises of an ISDN transmission path 2 from a central office (CO) 1, which affect an ADSL transmission path 3 constituting a xDSL transmission path bound with the ISDN transmission path 2 midway as an aggregated line.

When viewed from the ADSL terminal equipment (ATU-R; ADSL transceiver unit, remote terminal end) 4 constituting a communication unit at a terminal of the ADSL communication system, the interference noise transmitted through the ADSL transmission path 3 by the office equipment (ISDN LT) 7 of the ISDN transmission system is called the FEXT (Far-End crossTalk) noise, while the interference noise transmitted through the ADSL transmission path 3 by the terminal equipment (ISDN NT1) 6 of the ISDN transmission system is called the NEXT (Near-End crossTalk) noise. Especially, these noises are transmitted to the ADSL terminal equipment (ATU-R) 4 through the ADSL transmission path 3 which is coupled with the ISDN transmission path 2 midway as an aggregated line.

When viewed from the ADSL office equipment (ATU-C: ADSL transceiver unit, central office end) 5 constituting the office equipment of the ADSL communication system, on the other hand, the result is opposite from the case viewed from the ADSL terminal equipment (ATU-R) 4. In such a case, the interference noise transmitted by the office equipment (ISDN LT) 7 of the ISDN transmission system constitutes the NEXT noise, while the interference noise transmitted by the terminal equipment (ISDN NT1) 6 of the ISDN transmission system makes up the FEXT noise.

In overseas ISDN communication system which is full-duplexed, the up and down transmissions are performed at the same time. When viewed from the ADSL terminal equipment (ATU-R) 4, therefore, the NEXT noise generated by the terminal equipment (ISDN NT1) 6 of the ISDN transmission system nearer to the ADSL terminal equipment (ATU-R) 4 is controlling, i.e. has a larger effect.

For this reason, during the training period of the ADSL modem (not shown) installed at the ADSL terminal equipment 4, the characteristic of the NEXT noise components having a large effect is measured, and the number of transmission bits and the gain of each channel meeting the noise characteristic are determined by bit mapping. Further, in order to improve the transmission characteristics, the coefficients of the time domain equalizer (TEQ) for adaptive equalization in time domain and the frequency domain equalizer (FEQ) for adaptive equalization in frequency domain are converged and determined, so that a set of coefficient tables for NEXT noises are provided for each of TEQ and FEQ.

Although this measure eliminates the problem in the overseas digital communication systems, the half-duplex communication system TCM-ISDN employed in Japan as an existing ISDN communication system, in which the up and down data transmission are switched by time division like Ping-Pong poses a problem. Namely, in the case where the half-duplex transmission path and other transmission path are adjacently placed to each other as an aggregated line or the like, the NEXT noises and the FEXT noises from the half-duplex transmission path have an effect alternately on the communication terminals connected to the other transmission paths adjacent to the half-duplex transmission path.

In the Japanese ADSL system, therefore, a method is proposed in which the bit map is switched in accordance with the FEXT and NEXT sections of the TCM-ISDN interference noises ("G.lite: Proposal for draft of Annex of G.lite", ITU-T, SG-15, Waikiki, Hawaii Jun. 29,–Jul. 3, 1998, Temporary Document WH-047).

FIG. 13 shows an outline of a digital communication system using the digital communication equipment employing the method described in the above literature. In FIG. 13, numeral 11 designates a central office (CO) for controlling the TCM-ISDN communication and the ADSL communication, numeral 12 designates a TCM-ISDN transmission path for the TCM-ISDN communication, numeral 13 designates an ADSL transmission path for the ADSL communication, numeral 14 designates an ADSL terminal equipment (ATU-R; ADSL transceiver unit, remote terminal end) such as a communication modem for performing the ADSL communication with other ADSL communication terminal equipment (not shown) through the ADSL transmission path 13, numeral 15 designates an ADSL office equipment (ATU-C; ADSL transceiver unit, central office end) for controlling the ADSL communication within the central office 11, numeral 16 designates a TCM-ISDN terminal equipment (TCM-ISDN NT1) such as a communication modem for performing the TCM-ISDN communication with other TCM-ISDN terminal equipment (not shown) through the TCM-ISDN transmission path 12, numeral 17 designates a TCM-ISDN office equipment (TCM-ISDN LT) for controlling the TCM-ISDN communication in the central office 11, and numeral 18 designates a sync controller for synchronizing the communication between the TCM-ISDN office equipment (TCM-ISDN LT) 17 and the ADSL office equipment (ATU-C) 15. The sync controller 18 may alternatively be installed in the TCM-ISDN office equipment (TCM-ISDN LT) 17 or in the ADSL office equipment (ATU-C) 15.

As described above, the interference noise transmitted, through the TCM-ISDN transmission path 12 and the ADSL transmission path 13 adjacently placed to each other as an aggregated line, by the TCM-ISDN office equipment (TCM-ISDN LT) 17 providing a far half-duplex communication system when viewed from the ADSL terminal equipment (ATU-R) 14, as shown in Fig. 13, is called the "FEXT noise". On the other hand, the interference noise transmitted, through the TCM-ISDN transmission path 12 and the ADSL transmission path 13 adjacently placed to each other as an aggregated line, by the TCM-ISDN terminal equipment (TCM-ISDN NT1) 16 constituting a near half-duplex communication system is called the "NEXT noise".

When viewed from the ADSL office equipment (ATU-C) 15, on the other hand, the case is opposite to that viewed from the ADSL terminal equipment (ATU-R) 14, and the interference noise transmitted by the office equipment (ISDN LT) 17 of the ISDN transmission system constituting the near half-duplex communication system is the NEXT noise, while the interference noise transmitted by the terminal equipment (ISDN NT1) 16 of the ISDN transmission system making up a far half-duplex communication system constitutes the FEXT noise.

FIG. 14 shows a functional configuration of a transmission unit or a dedicated transmitter (hereinafter collectively referred to as the transmission system) such as a communication modem of the ADSL office equipment (ATU-C; ADSL transceiver unit, central office end) 15 of the digital communication system. On the other hand, FIG. 15 shows a functional configuration of a receiving unit or a dedicated receiver (hereinafter collectively referred to as the receiving system) such as a communication modem of the ADSL terminal equipment (ATU-R) 14 of the digital communication system.

In FIG. 14, numeral 41 designates a multiplex/sync controller, numerals 42 and 43 designate cyclic redundancy check (crc) units, numerals 44 and 45 designate scramble forward error correction units (Scram and FEC), numeral 46 designates an interleaver, numerals 47 and 48 designate rate converters, numeral 49 designates a tone ordering unit, numeral 50 a constellation encoder and gain scaling unit, numeral 51 designates an inverse discrete Fourier transform unit (IDFT), numeral 52 designates an input parallel/serial buffer, and numeral 53 designates an analog processing and D/A converter (DAC).

In FIG. 15, numeral 141 designates an analog processing and A/D converter (ADC), numeral 142 designates a time domain equalizer (TEQ), numeral 143 designates an input serial/parallel buffer, numeral 144 designates a discrete Fourier transform unit (DFT), numeral 145 designates a frequency domain equalizer (FEQ), numeral 146 designates a constellation encoder and gain scaling unit, numeral 147 designates a tone ordering unit, numerals 148 and 149 designate rate converters, numeral 150 designates a deinterleaver, numerals 151 and 152 designate descramble forward error correction units (FEC), numerals 153 and 154 designate cyclic redundancy check units (crc), and numeral 155 designate a multiplex/sync controller.

Now, the operation will be explained. To begin with, the operation of the transmission system of the ADSL office equipment (ATU-C) 15 will be explained. In FIG. 14, the transmission data are multiplexed by the multiplex/sync controller 41, and have an error detection code added thereto by the cyclic redundancy check units 42, 43, have the FEC code added thereto and subjected to the scramble processing by the scramble forward error correction units 44, 45, sometimes followed by the processing in the interleaver 46. After that, the rate is converted by the rate converters 47, 48, the tone ordering is executed by the tone ordering unit 49, the constellation data are produced by the constellation encoder and gain scaling unit 50, the inverse discrete Fourier transform is performed by the inverse discrete Fourier transform unit 51, the digital waveform is converted into an analog waveform through the D/A converter, and then the signal is passed through a low-pass filter.

The operation of the receiving system of the ADSL terminal equipment (ATU-R) 14 will now be explained. In FIG. 15, the analog processing A/D converter 141 applies the received signal through a low-pass filter, and converts the analog waveform into a digital waveform through the A/D converter, followed by the time domain adaptive equalization in the time domain equalizer (TEQ) 142.

Then, the data subjected to the time domain adaptive equalization are converted from serial to parallel data by the input serial/parallel buffer 143, subjected to discrete Fourier transform in the discrete Fourier transform unit (DFT) 144, and then subjected to frequency domain adaptive equalization by the frequency domain equalizer (FEQ) 145.

The constellation data are reproduced by the constellation encoder and gain scaling unit 146, converted into the serial data by the tone ordering unit 147, have the rate converted in the rate converters 148, 149, subjected to the descramble processing and FEC by the descramble and forward error correction unit 151, and in some cases, after being deinterleaved by the deinterleaver 150, subjected to FEC and descramble processing by the descramble and forward error correction unit 152. After the processing in the cyclic redundancy check unit 153, 154, the data are reproduced by the multiplex/sync controller 155.

In this process, the sync controller 18 of the central office (CO) 11 synchronizes the transmission timing between the TCM-ISDN office equipment (TCM-ISDN LT) 17 and the ADSL office equipment (ATU-C) 15. Thus, the ADSL terminal equipment (ATU-R) 14 can recognize the timing of generation of NEXT noise and FEXT noise.

Specifically, the ADSL terminal equipment (ATU-R) 14, by the synchronization between the TCM-ISDN communication and the ADSL communication, determines that the NEXT noise is generated in the received data or the signal received through the ADSL transmission path 13 during a predetermined time when the data are transmitted up the TCM-ISDN transmission path 12 at a known timing. On the other hand, during a predetermined time when the data are transmitted down the TCM-ISDN transmission path 12 at a known timing, the generation of the FEXT can be similarly recognized in the data received through the ADSL transmission path 13.

In the Japanese ADSL system, as shown in FIG. 16, the bit map A and the bit map B are assigned to the FEXT sections and the NEXT sections, respectively, and in the rate converters 47, 48 of FIG. 14, more bits are assigned to the FEXT section having a small noise, and less bits are assigned to the NEXT section having a large noise. As a result, the transmission rate can be improved as compared with the conventional case in which the bit distribution is determined only by the NEXT section.

FIG. 17 shows the manner in which the data received at the uniform rate (64 kbps in the calculation example below) are assigned to the bit map A and the bit map B at the time of transmission. First, the data sent in at the uniform rate are stored in the form of fixed bits in units of symbols. These data are converted into bits for the bit map A and the bit map B by the rate converter. An integer multiple is not involved, however, because the interval of the transmitted symbols is 246 $\mu$s for the ISDN period of 2.5 ms.

Thus, as shown in FIG. 18, with 34 periods (=345 symbols, 85 ms) as one unit (hyperframe), only the FEXT section in the hyperframe where the symbols are filled up is defined as a bit map A, and the other portions as a bit map B (in the drawing, SS and ISS indicate sync signals). Whether each DMT symbol is associated with the bit map A or the bit map B is determined from the following equations. (In the equations below, the DMT symbol No. is assumed to be Ndmt).

.Transmission from ATU-C to ATU-R $$S = 272 \times Ndmt \bmod 2760$$

if $\{(S+271<a) \text{ or } (S>a+b)\}$ then [bit map A symbol]
if $\{(S+271>=a) \text{ and } (S<=a+b)\}$ then [bit map B symbol]
where a=1243, and b=1461.

.Transmission from ATU-R to ATU-C $$S = 272 \times Ndmt \bmod 2760$$

if $\{(S>a) \text{ and } (S+271<a+b)\}$ then [bit map A symbol]
if $\{(S<=a) \text{ or } (S+271>=a+b)\}$ then [bit map B symbol]
where a=1315, and b=1293.

An example of calculation for determining the bit assignment for the single bit map using only the bit map A is shown below.

.Number of bits of 1 DMT symbol (before rate conversion) = (transmission rate) × (transmission time)/(total number of symbols (except for ISS (inverse sync symbol) and SS (sync symbol)))
= 64 kbps × 85 ms/340
= 16 bits .Number of bits of bit map A = (transmission rate) × (transmission time)/(total number of symbols of bit map A (except for ISS (inverse sync symbol) and SS (side A sync symbol)))
= 64 kbps × 85 ms/126
= 43.175

Thus, the bit map A is assumed to be equal to 44 bits. Also, because of a single bit map (only the bit map A is used), the bit map B is set to zero.

In this bit distribution, transmission is started only after data are stored to some degree at the uniform rate. Therefore, a delay time is generated at the time of transmission of each symbol. This delay time differs depending upon the symbol number (place of each symbol). As a result of determining the delay time for all the symbols in the example of FIG. 18, the symbol No. 145 is found to have a maximum delay time. An example of calculation of the delay time using the bit assignment determined by the foregoing calculation is explained below. FIG. 19 shows a transmission delay.

.Transmission delay time (worst value is for symbol No. 145) = (time required for storing total number of transmitted bits) − (symbol No. +1) × (one symbol time)
= (total number of transmitted bits)/ (transmission rate) − (symbol No. +1) × (one symbol time)
= (number of bit map A) × (number of bits of bit map A)/(transmission rate) − (symbol No. +1) × (1 symbol time)
= 58 × 44/64 kbps − 146 × (0.25 ms × 272/276)
= 3.9040 ms In order not to interrupt the data after rate conversion due to the delay at the transmitting end, the corresponding amount is offset using a buffer or the like. The sum 4.1504 ms of this offset (3.9040 ms) and one symbol time (0.24637 ms) constituting the processing delay of the inverse discrete Fourier transform unit (IDFT) in the transmission unit is the transmission delay.

At the receiving end, on the other hand, the data sent in are converted into a uniform rate. In this process, it may happen that the data which otherwise should have arrived at uniform rate may fail to do so due to the change in bit distribution at the time of transmission at the transmitting end (see FIG. 20). This delay time at the receiving end is maximum for symbol No. 30 in the case shown in FIG. 18.

.Receiving delay time (worst value is for symbol No. 30) = (symbol No. +1) × (one symbol time) − (total number of transmitted bits)/ (transmission rate)
= (symbol No. +1) × (one symbol time) − (number of bit map A) × (number of bits of bit map A)/(transmission rate)
= 31 × 0.25 ms × 272/276 − 11 × 44/64 kbps
= 0.07518 ms In order not to interrupt the data after rate conversion due to this delay at the receiving end, a corresponding amount is offset using a buffer or the like. As a result, the sum 0.32155 ms of the offset (0.07518 ms) and one symbol time (0.24637 ms) constituting the processing delay in the discrete Fourier transform unit (DFT) is determined as the receiving delay.

Thus, for the transmission rate of 64 kbps, the sum 4.4719 ms of the transmission delay time (4.1504 ms) and the receiving delay time (0.32155 ms) makes up the maximum delay time in the transmission and receiving units.

The following is an example of calculation for determining the bit assignment for the dual bit map where both the bit map A and the bit map B are used.

.Number of bits of 1 DMT symbol (before rate conversion) = (transmission rate) × (transmission time)/(total number of symbols (except for ISS (inverse sync symbol) and SS (sync symbol)))
= 64 kbps × 85 ms/340

= 16 bits

.This calculation example assumes that the number of bits of the bit map B is 3.

.Number of bits of bit map A = ((transmission rate) × (transmission time) − (number of bits per symbol of bit map B) × (number of symbols of bit map B (except for ISS (inverse sync symbol) and SS (side A sync symbol)))/(number of symbols of bit map A (except for ISS (inverse sync symbol) and SS (side A sync symbol))))

= (64 kbps × 85 ms − 3 × 214)/126

= 38.079 bits

Thus, the bit map A has 39 bits.

In this bit distribution, the data at the uniform rate are transmitted only after being stored to some degree, and therefore a delay time occurs when each symbol is transmitted. This delay time differs depending upon the symbol No. (place of each symbol). In the case of FIG. 18 (39 bits distributed to bit map A and 3 bits to bit map B), assume that the delay time is determined for all the symbols. The symbol associated with the maximum delay time is symbol No. 145. An example calculation of the delay time using the bit distribution determined in the aforementioned calculation example is shown below. FIG. 21 shows a transmission delay.

.Transmission delay time (worst value is for symbol No. 145) = (time required for storing total number of transmitted bits) − (symbol No. +1) × (one symbol time)

= (total number of transmitted bits)/(transmission rate) − (symbol No. +1) × (one symbol time)

= ((number of bit map A) × (number of bits of bit map A) + (number of bit map B) × (number of bits of bit map B))/(transmission rate) − (symbol No. +1) × (one symbol time)

= (58 × 39 + 86 × 3)/64 kbps − 146 × (0.25 ms × 272/276)

= 3.4040 ms

In order not to interrupt the data after rate conversion due to this delay at the transmitting end, a corresponding amount is offset using a buffer or the like. As a result, the sum 3.6504 ms of the offset (3.4040 ms) and one symbol time (0.24637 ms) making up the processing delay of the inverse discrete Fourier transform unit (IDFT) constitutes the transmission delay.

At the receiving end, on the other hand, the data sent in are converted into a uniform rate. In this process, it may happen that the data which otherwise should have arrived at uniform rate fail to do so due to the change in bit distribution at the time of being transmitted at the transmitting end (see FIG. 22). This delay time at the receiving end is maximum for symbol No. 30 in the case shown in FIG. 18.

.Receiving delay time (worst value is for symbol No. 30) = (symbol No. +1) × (one symbol time) − (total number of transmitted bits)/(transmission rate)

= (symbol No. +1) × (one symbol time) − ((number of bit map A) × (number of bits of bit map A) + (number of bit map B) × (number of bits of bit map B))/(transmission rate)

= 31 × 0.25 ms × 272/276 − (11 × 39 + 20 × 3)/64 kbps

= −0.0029438 ms

This delay at the receiving end is on minus side at worst, and therefore can be offset by the aforementioned amount in advance. The sum 0.24343 ms of the offset (−0.0029438 ms) and one symbol time (0.24637 ms) making up the processing delay of the discrete Fourier transform unit (DFT) in the receiving unit is determined as the receiving delay.

Thus, for the transmission rate of 64 kbps, the maximum delay time in the transmission and receiving units is 3.8938 ms which is the sum of the transmission delay time of 3.6504 ms and the receiving delay time of 0.24343 ms.

This system poses the problem of an excessively large delay.

Accordingly, an object of the present invention is to provide a communication system and a communication method capable of suppressing the delay within a predetermined period (for example one ISDN period (2.5 ms)).

DISCLOSURE OF THE INVENTION

According to one aspect of the present invention, there is provided a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time of one period, and wherein dummy bits are assigned to the portion of the data transmission time to which the data to be transmitted has not assigned.

According to another aspect of the present invention, there is provided a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time and the quasi-data transmission time of one period, and wherein dummy bits are assigned to the portion of the data transmission time and the portion of the quasi-data transmission time to which the data to be transmitted has not assigned.

Further, there is provided a communication system for appropriately selecting a low transmission delay mode in which bits are assigned in such a manner that the data of a given period is transmitted during the data transmission time of one period and dummy bits are assigned to the portion of the data transmission time to which the data to be transmitted has not assigned, or a normal mode in which the data to be transmitted are assigned uniformly over the data transmission time, so that the bits for the data to be transmitted are assigned in accordance with the selected mode.

Further, there is provided a communication system for appropriately selecting a low transmission delay mode in which the data of a given period are assigned to the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that bits for the data to be transmitted are assigned in accordance with the selected mode.

According to still another aspect of the present invention, there is provided a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein all the data of a given period are reproduced based on the portion of the received data assigned to the data transmission time of one period.

According to still another aspect of the present invention, there is provided a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, and wherein all the data of one period are reproduced based on the portion of the received data assigned to the data transmission time and the quasi-data transmission time of one period.

Further, there is provided a communication system for appropriately selecting a low transmission delay mode in which bits are assigned in such a manner that the data of a given period can be transmitted during the data transmission time of one period and dummy bits are assigned to the portion of the data transmission time to which the data to be transmitted has not assigned, or a normal mode in which the data to be transmitted are assigned uniformly over the data transmission time, so that data are reproduced in accordance with the selected mode.

Further, there is provided a communication system for appropriately selecting a low transmission delay mode in which bits are assigned in such a manner that the data of a given period can be transmitted during the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that data are reproduced in accordance with the selected mode.

According to still another aspect of the present invention, there is provided a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time of one period, and wherein dummy bits are assigned to the portion of the data transmission time to which the data to be transmitted has not assigned.

According to still another aspect of the present invention, there is provided a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time and the quasi-data transmission time of one period, and wherein dummy bits are assigned to the portion of the data transmission time and the portion of the quasi-data transmission time to which the data to be transmitted has not assigned.

Further, there is provided a communication method for appropriately selecting a low transmission delay mode in which bits are assigned in such a manner that the data of a given period is transmitted during the data transmission time of one period and dummy bits are assigned to the portion of the data transmission time to which the data to be transmitted has not assigned, or a normal mode in which the data to be transmitted are assigned uniformly over the data transmission time, so that the bits for the data to be transmitted are assigned in accordance with the selected mode.

Further, there is provided a communication method for appropriately selecting a low transmission delay mode in which the data of a given period are assigned to the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that bits for the data to be transmitted are assigned in accordance with the selected mode.

According to still another aspect of the present invention, there is provided a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein all the data of a given period are reproduced based on the portion of the received data assigned to the data transmission time of one period.

According to still another aspect of the present invention, there is provided a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, and wherein all the data of one period are reproduced based on the portion of the received data assigned to the data transmission time and the quasi-data transmission time of one period.

Further, there is provided a communication method for appropriately selecting a low transmission delay mode in which bits are assigned in such a manner that the data of a given period can be transmitted during the data transmission time of one period and dummy bits are assigned to the portion of the data transmission time to which the data to be transmitted has not assigned, or a normal mode in which the data to be transmitted are assigned uniformly over the data transmission time, so that data are reproduced in accordance with the selected mode.

Further, there is provided a communication method for appropriately selecting a low transmission delay mode in which bits are assigned in such a manner that the data of a given period can be transmitted during the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that data are reproduced in accordance with the selected mode.

BRIEF DESCRIPTION OF THE DRAWINGS

FIG. 7 is a diagram for explaining a table delivered between the transmitting and receiving ends when initializing the communication system according to the prior art, FIG. 8 is a diagram for explaining a table delivered between the transmitting and receiving ends when initializing the communication system according to the present invention.

BEST MODE FOR CARRYING OUT THE INVENTION

For understanding the present invention in more detail, an explanation will be given with reference to the accompanying drawings.

According to this embodiment, in order to suppress the delay, bits are assigned in such a manner that the transmission data of one period can be transmitted during the data transmission time of one period. An example of calculation will be explained for determining the bit assignment in the case of single bit map using the bit map A alone. The bit assignment is conducted by the rate converters 47, 48 shown in FIG. 14 like the conventional communication system.

Figure 1:
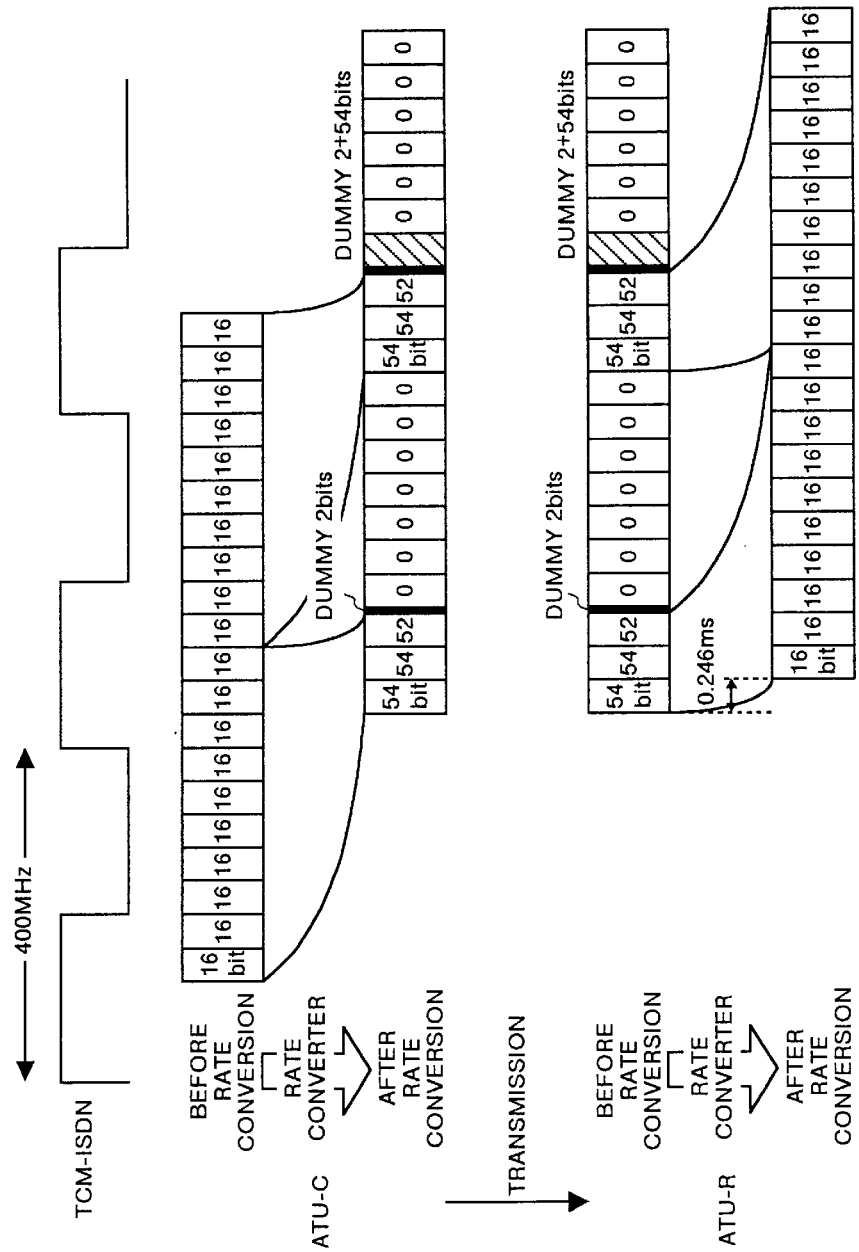
FIG. 1 is a diagram for explaining an outline of bit assignment of a communication system according to the present invention.

FIG. 1 shows an outline of the bit assignment. Bits are assigned in such a manner that the uniform data of one period can all be transmitted during the data transmission time which is the time (corresponding to the FEXT section described above) suitable for data transmission in one period. Also, dummy data are assigned to the portion of the data transmission time to which the data could not be assigned. Bits are assigned, for example, in such a manner that one period (2.5 ms) of data, i.e. ten DMT symbols of data are inserted in three symbols of the bit map A (symbols that can be fully inserted in the data transmission time), and dummy bits are assigned to the bits remaining in the third symbol of the bit map A. Further, in the case where the bit map A has four successive symbols, on the other hand, dummy bits are assigned to the entire fourth symbol of the bit map A. Specifically, the number of bits of the bit map A is required to meet the following conditions.

.(number of bits of bit map A)×3≧(transmission rate in kbps)×(one period 2.5 ms)

The specifications for this bit assignment are as follows (an example of calculation of the bit assignment for the transmission rate of 64 kbps in the embodiment).

.Number of bits of 1 DMT symbol (before rate conversion) = (transmission rate) × (transmission time)/(total number of symbols (except for ISS (inverse sync symbol) and SS (sync symbol)))

= 64 kbps × 85 ms/340

= 16 bits

-continued $$\begin{aligned}
\text{Number of bits of bit map A} &= \text{(number of bits of 1 DMT symbol)} \times \\
&\quad \text{(ten DMT symbols)}/\text{(3 symbols)} \\
&= 16 \times 10/3 \\
&= 53.33
\end{aligned}$$

Thus, the bit map A is equal to 54 bits.

$$\begin{aligned}
\text{Dummy bits for third bit} &= \text{(number of bits of bit map A)} \times \\
\text{map A in each period} &\quad \text{(3 symbols)} - \text{(number of bits for 1} \\
&\quad \text{DMT symbol)} \times \text{(ten DMT symbols)} \\
&= 54 \times 3 - 16 \times 10 \\
&= 2 \text{ bits.}
\end{aligned}$$

In the presence of the fourth bit map A, dummy bits are used for all the transmission bits. Also, due to the single bit map (only the bit map A is used), the bit map B is set to zero bit.

Figure 2:
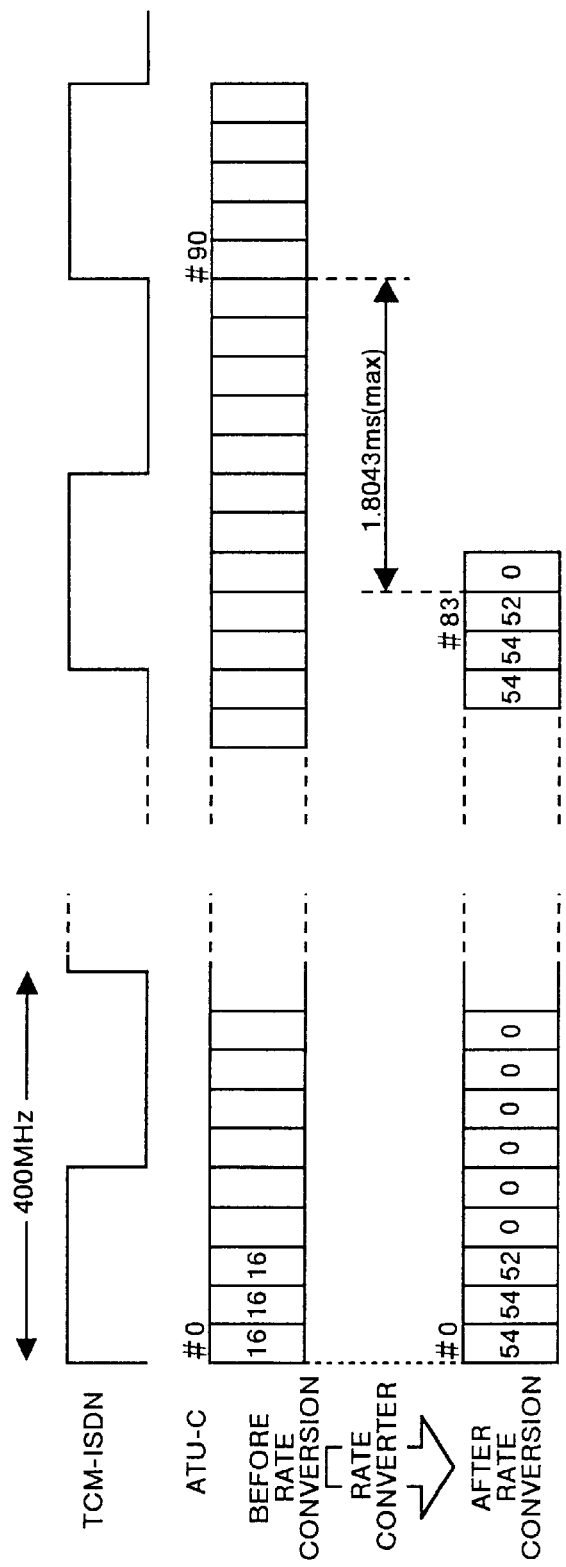
FIG. 2 is a diagram for explaining the transmission delay time with a single bit map according to the present invention.

In this bit distribution, the delay time is given as follows (see FIG. 2).

$$\begin{aligned}
\text{Transmission delay time (worst} &= \text{(time required for storing total} \\
\text{value is for symbol No. 83)} &\quad \text{number of transmitted bits)} - \\
&\quad \text{(symbol No. +1)} \times \text{(one symbol time)} \\
&= \text{(total number of transmitted bits)}/ \\
&\quad \text{(transmission rate)} - \text{(symbol No. +1)} \times \\
&\quad \text{(one symbol time)} \\
&= 9 \times 160/64 \text{ kbps} - 84 \times (0.25 \text{ ms} \times \\
&\quad 272/276) \\
&= 1.8043 \text{ ms}
\end{aligned}$$

In order not to interrupt the data after rate conversion due to the delay at the transmitting end, a corresponding amount is offset using the buffer or the like. As a result, the sum 2.05072 ms of this offset (1.8043 ms) and one symbol time (0.24637 ms) making up the processing delay of the inverse discrete Fourier transform unit (IDFT) in the transmission unit is determined as the transmission delay.

Figure 3:
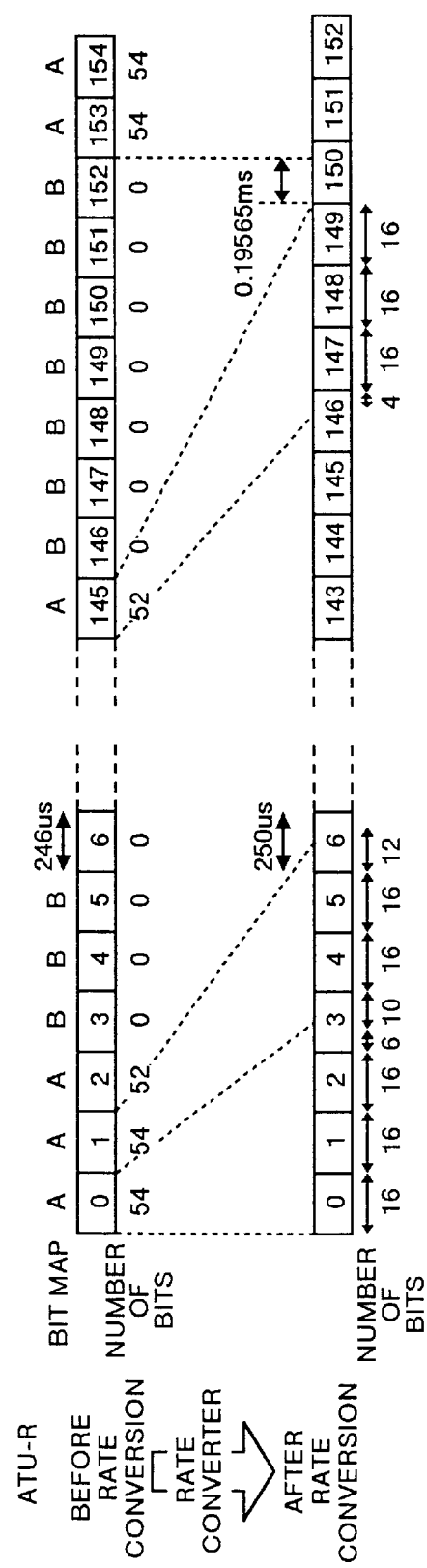
FIG. 3 is a diagram for explaining the receiving delay time with a single bit map according to the present invention.
Figure 18:
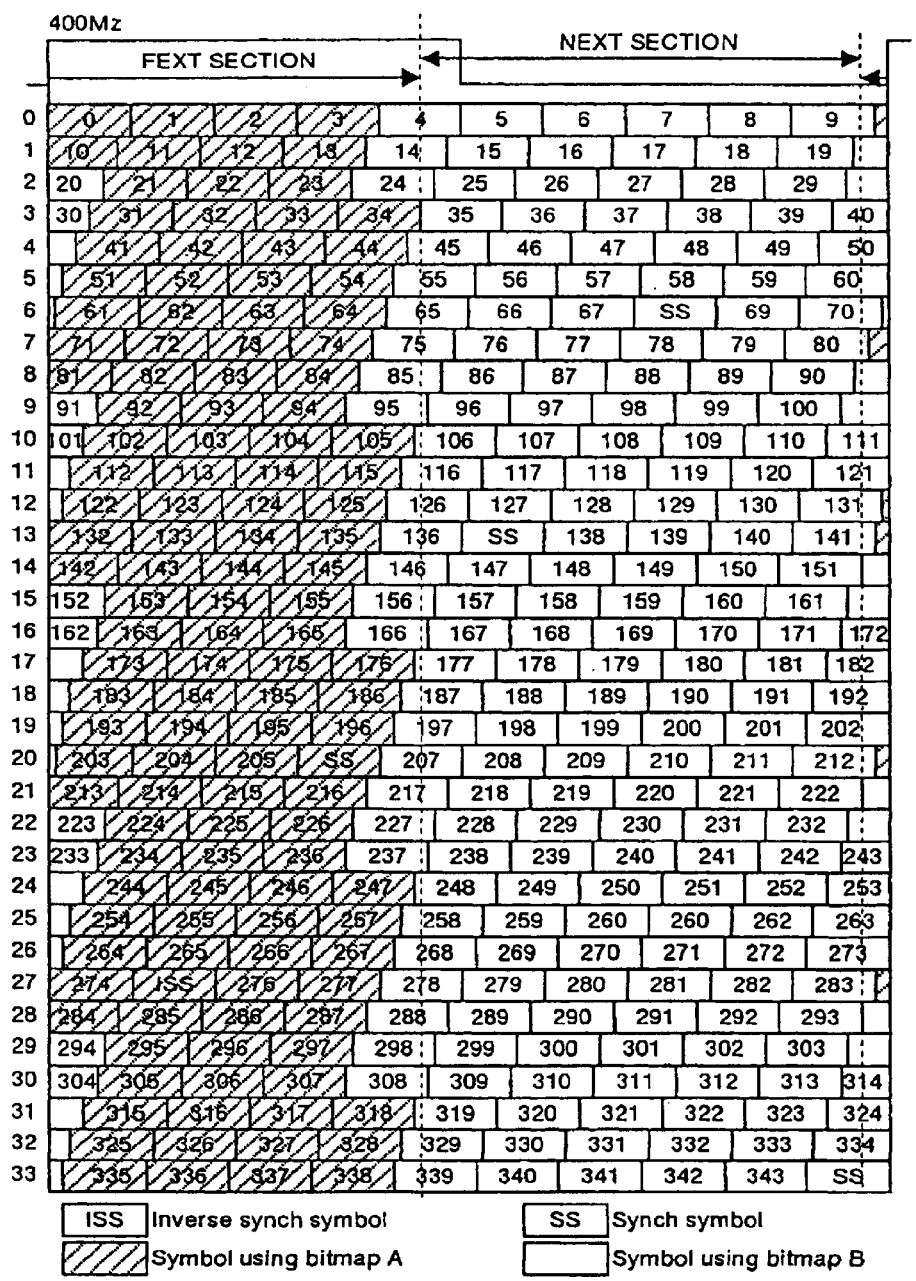
FIG. 18 is a diagram for explaining a hyperframe structure.
Figure 19:
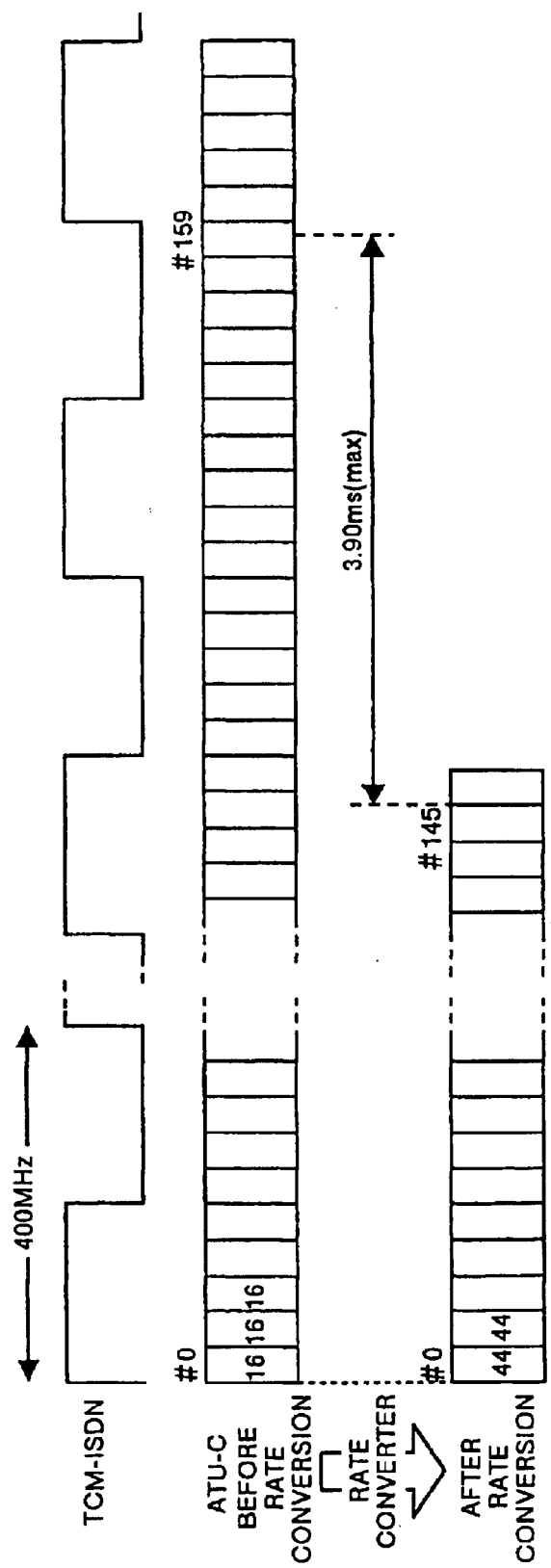
FIG. 19 is a diagram for explaining the transmission delay time with a single bit map according to the prior art.
Figure 20:
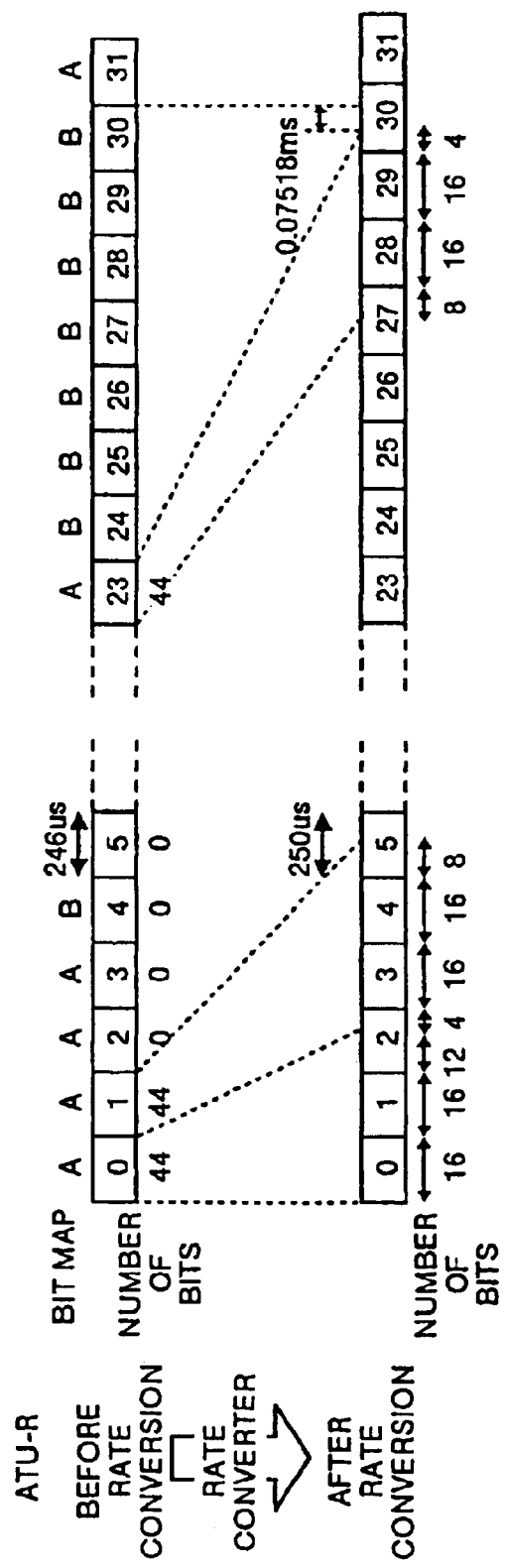
FIG. 20 is a diagram for explaining the receiving delay time with a single bit map according to the prior art.
Figure 21:
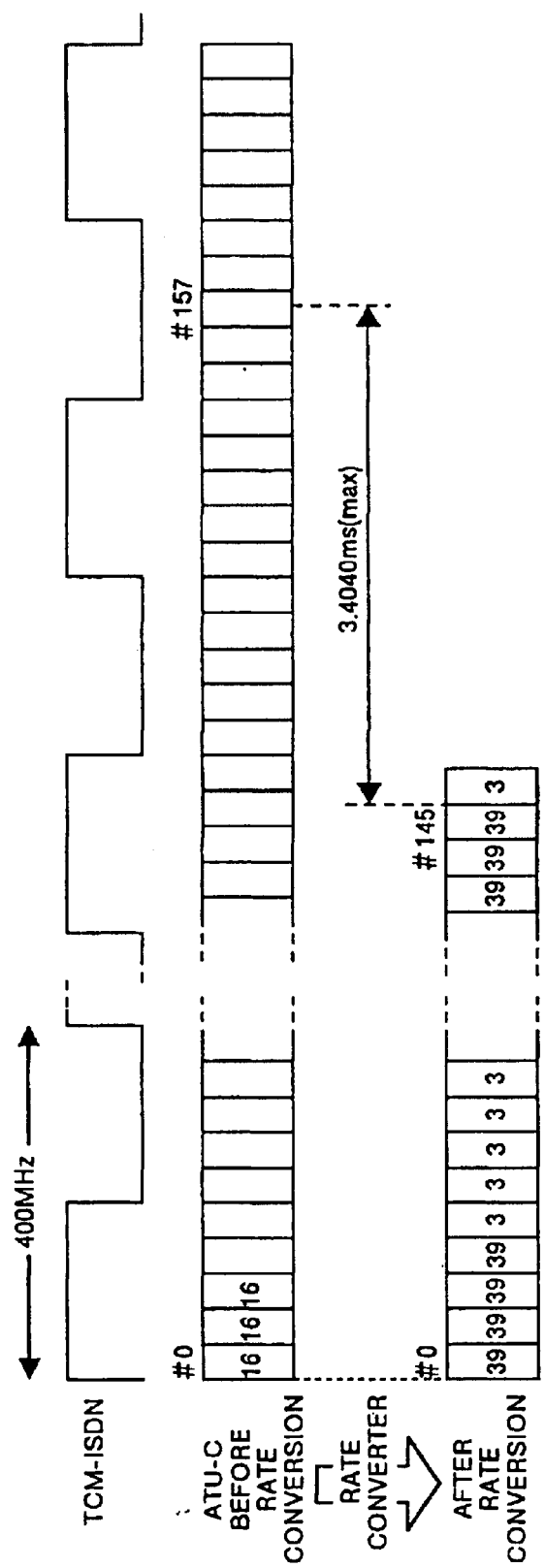
FIG. 21 is a diagram for explaining the transmission delay time with a dual bit map according to the prior art.
Figure 22:
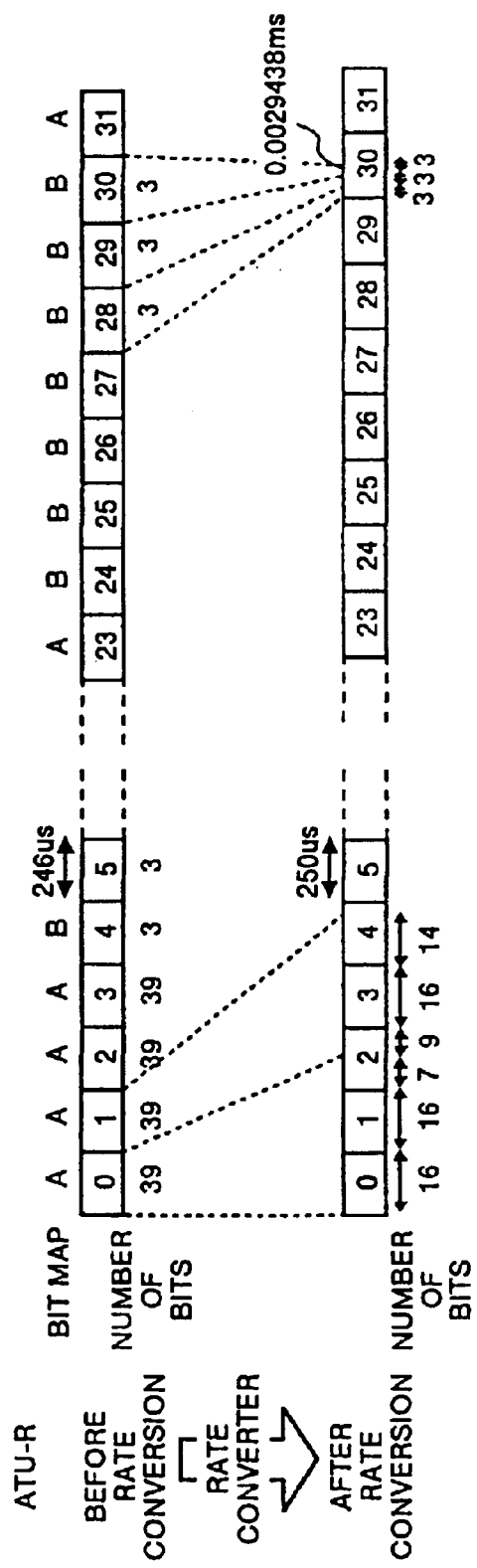
FIG. 22 is a diagram for explaining the receiving delay time with a dual bit map according to the prior art.

At the receiving end, on the other hand, the data sent in are converted into a uniform rate. In this process, it may happen that the data which otherwise should have arrived at the uniform rate fail to do so due to the change in the bit distribution at the time of transmission at the transmitting end (see FIG. 3). This delay time at the receiving end is maximum for symbol No. 152 in the case of the frame structure shown in FIG. 18.

$$\begin{aligned}
\text{Receiving delay time (worst} &= \text{(symbol No. +1)} \times \text{(one symbol time)} - \\
\text{value is for symbol No. 152)} &\quad \text{(total number of transmitted bits)}/ \\
&\quad \text{(transmission rate)} \\
&= 153 \times 0.25 \text{ ms} \times 272/276 - \\
&\quad 15 \times 160/64 \text{ kbps} \\
&= 0.19565 \text{ ms}
\end{aligned}$$

In order not to interrupt the data after rate conversion due to this delay at the receiving end, a corresponding amount is offset using the buffer or the like. As a result, the sum 0.44203 ms of the offset (0.19565 ms) and one symbol time (0.24637 ms) constituting the processing delay of the discrete Fourier transform unit (DFT) in the receiving unit is determined as the receiving delay.

For the transmission rate of 64 kbps, therefore, the sum 2.49275 ms of the transmission delay time (2.05072 ms) and the receiving delay time (0.44203 ms) makes up the maximum delay time in the transmission and receiving equipment, so that the delay can be suppressed to not more than 2.5 ms constituting one period of ISDN.

This embodiment has been explained with reference to the transmission rate of 64 kbps. The delay time can be suppressed in similar fashion also for other transmission rates.

An example of calculation for determining the bit assignment for the dual bit map where both the bit map A and the bit map B are used is explained below. The bit assignment is conducted in the rate converters 47, 48 shown in FIG. 14 as in the conventional communication system.

Figure 4:
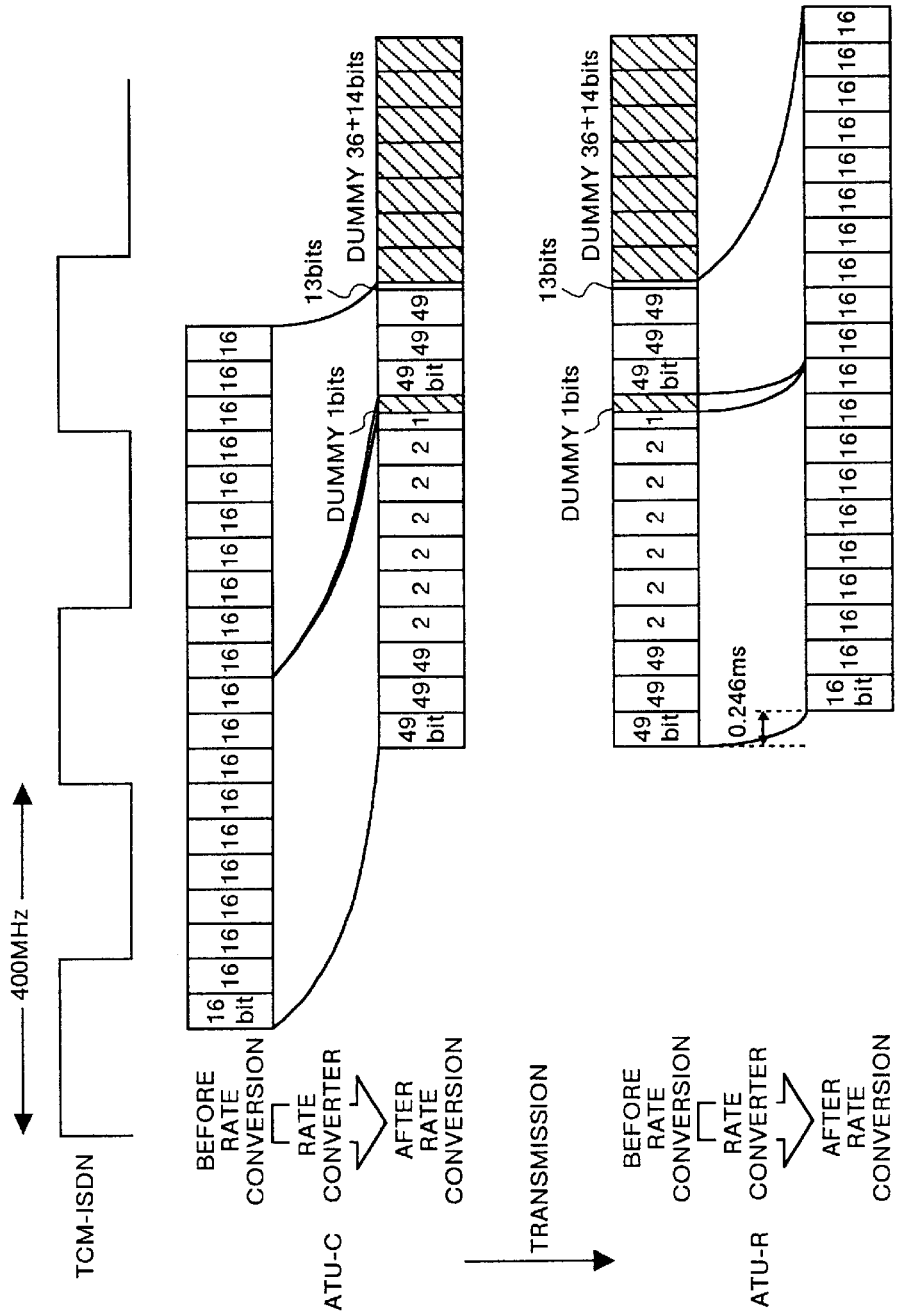
FIG. 4 is a diagram for explaining an outline of bit assignment of a communication system according to the present invention.

FIG. 4 shows an outline of the bit assignment according to this embodiment. Bits for uniform data of one period are assigned to the data transmission time (corresponding to the FEXT section described above, for example) suitable for data transmission and the quasi-data transmission time (corresponding to the NEXT section described above, for example) other than the data transmission time within one period. Further, of the data transmission time and the quasi-data transmission time the one to which the transmission data is not assigned is assigned a dummy data for transmission. Bits are assigned in such a manner that the data of one period (2.5 ms), i.e. the data of ten DMT symbols (before rate conversion) are inserted in a unit of ten symbols (after rate conversion) including three symbols of the bit map A (symbols that can be fully inserted in the data transmission time) plus seven symbols of the bit map B (quasi-data transmission time) (except for ISS (inverse sync symbol) and SS (sync symbol)). Further, the portion to which the data in the bit map B is not assigned is assigned dummy bits. Further, in the case where the bit map A has four successive symbols, the fourth symbol of the bit map A is also assigned the transmission data in the same way that the bits are assigned for the bit map A described above, and the portion to which the data in the bit map A and the bit map B is not assigned is assigned dummy bits. In this process, the delay amount can be reduced by minimizing the difference between the number of bits assigned to the bit map A and the number of bits assigned to the bit map B.

Specifically, the number of bits of the bit map A and the bit map B is required to meet the following conditions.

.(number of bits of bit map A)×3+(number of bits of bit map B)×7≧(transmission rate in kbps)×(one period, 2.5 ms)

.In order to reduce the delay time, the difference between the number of bits assigned to the bit map A and the number of bits assigned to the bit map B is minimized (the delay time assumes the worst value for the minimum value of the bit map B).

The specifications for this bit assignment are as follows (an example of calculation of bit assignment for the transmission rate of 64 kbps is shown in this embodiment).

$$\begin{aligned}
\text{Number of bits of 1 DMT symbol} &= \text{(transmission rate)} \times \text{(transmission} \\
\text{(before rate conversion)} &\quad \text{time)}/\text{(total number of symbols} \\
&\quad \text{(except for ISS (inverse sync} \\
&\quad \text{symbol) and SS (sync symbol)))} \\
&= 64 \text{ kbps} \times 85 \text{ ms}/340 \\
&= 16 \text{ bits}
\end{aligned}$$

This example of calculation assumes that the number of bits of the bit map B is two.

$$
\begin{aligned}
\text{Number of bits of} &= ((\text{number of bits for 1 DMT symbol}) \times \\
\text{bit map A} &\quad (\text{ten DMT symbols}) - (\text{total number of bits for} \\
&\quad \text{seven bit maps B})) / (3 \text{ symbols}) \\
&= (16 \times 10 - 2 \times 7) / 3 \\
&= 48.67
\end{aligned}
$$

Thus, the bit map A equals 49 bits.

$$
\begin{aligned}
\text{Dummy bits for the tenth} &= (\text{number of bits of bit map A}) \times \\
\text{bit map B in unit of ten} &\quad (3 \text{ symbols}) + (\text{number of bits of} \\
\text{symbols (after rate conversion)} &\quad \text{bit map B}) \times (7 \text{ symbols}) - (\text{number} \\
&\quad \text{of bits for 1 DMT symbol}) \times \\
&\quad (\text{ten DMT symbols}) \\
&= 49 \times 3 + 2 \times 7 - 16 \times 10 \\
&= 1 \text{ bit}
\end{aligned}
$$

Figure 5:
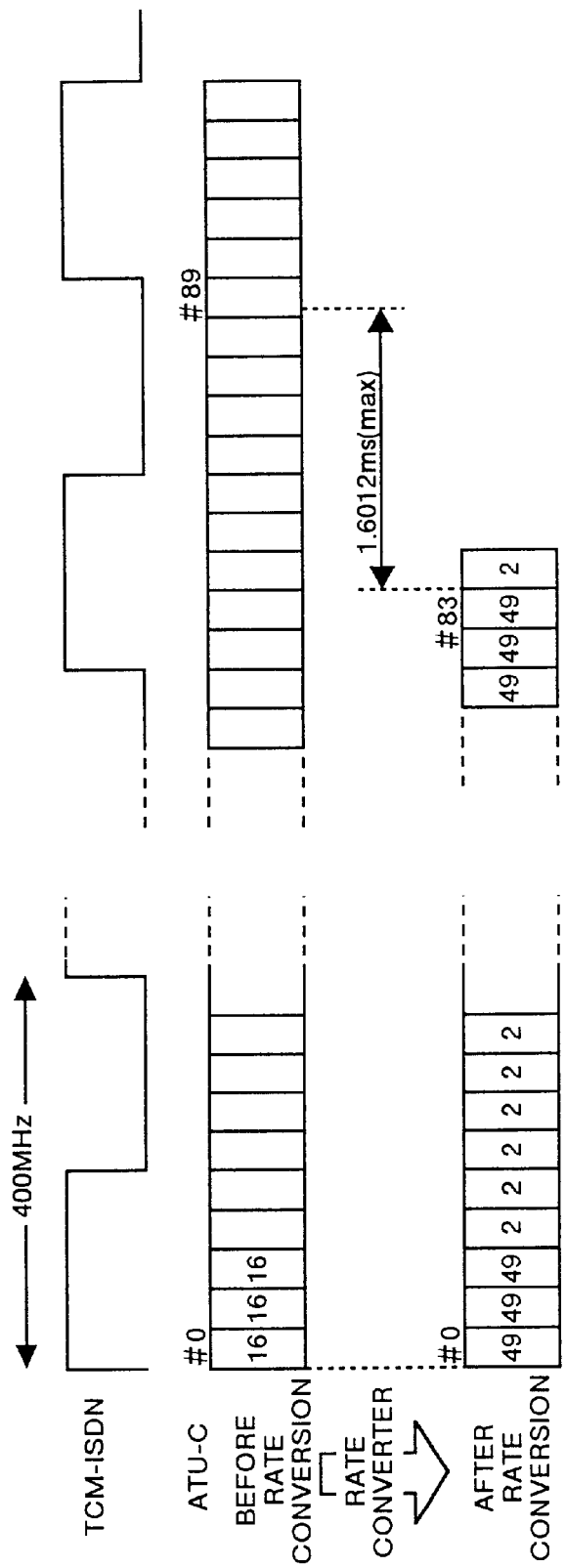
FIG. 5 is a diagram for explaining the transmission delay time with a dual bit map according to the present invention.

In this bit distribution, the delay time is given as follows (see FIG. 5).

$$
\begin{aligned}
\text{Transmission delay time (worst} &= (\text{time required for storing total} \\
\text{value is for symbol No. 83)} &\quad \text{number of transmitted bits}) - \\
&\quad (\text{symbol No.} + 1) \times (\text{one symbol time}) \\
&= (\text{total number of transmitted bits}) / \\
&\quad (\text{transmission rate}) - (\text{symbol No.} + 1) \times \\
&\quad (\text{one symbol time}) \\
&= (160 \times 8 + 49 \times 3) / 64 \text{ kbps} - \\
&\quad 84 \times (0.25 \text{ ms} \times 272 / 276) \\
&= 1.6012 \text{ ms}
\end{aligned}
$$

In order not to interrupt the data after rate conversion due to the delay at the transmitting end, a corresponding amount is offset using the buffer or the like. The sum 1.84759 ms of this offset (1.6012 ms) and one symbol time (0.24637 ms) making up the processing delay of the inverse discrete Fourier transform unit (IDFT) in the transmission unit constitutes the transmission delay.

Figure 6:
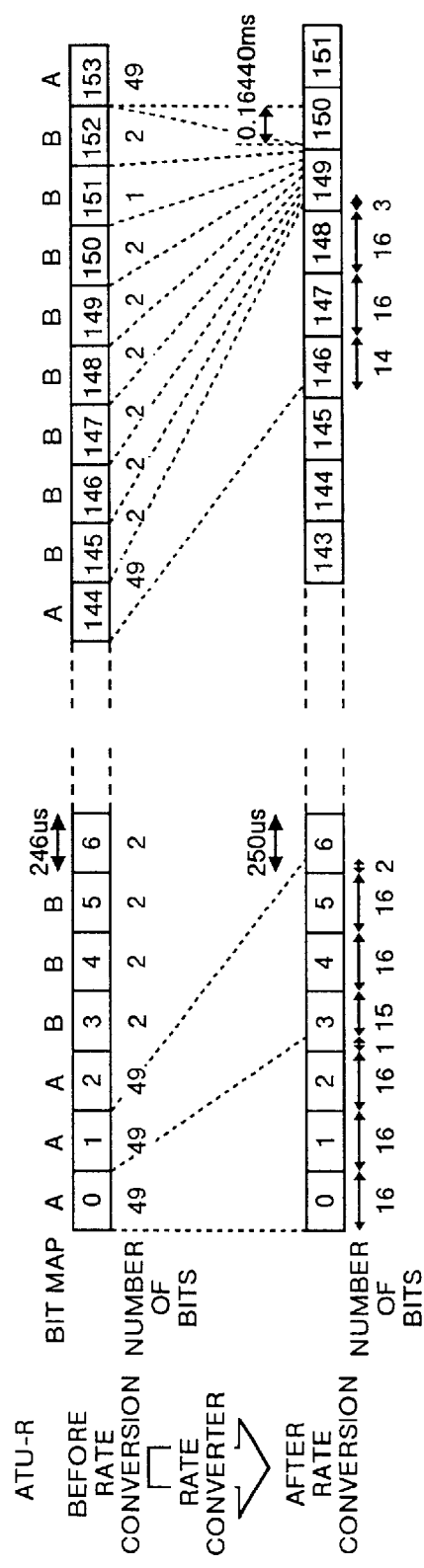
FIG. 6 is a diagram for explaining the receiving delay time with a dual bit map according to the present invention.

At the receiving end, on the other hand, the data sent in are converted into a uniform rate. In this process, it may happen that the data which otherwise should have arrived at uniform rate fail to do so due to the change in bit distribution at the time of transmission at the transmitting end (see FIG. 6). This delay time at the receiving end is maximum for symbol No. 152 in the case of the frame structure shown in FIG. 18.

$$
\begin{aligned}
\text{Receiving delay time (worst} &= (\text{symbol No.} + 1) \times (\text{one symbol time}) - \\
\text{value for symbol No. 152)} &\quad (\text{total number of transmitted bits}) / \\
&\quad (\text{transmission rate}) \\
&= 153 \times 0.25 \text{ ms} \times 272 / 276 - \\
&\quad (15 \times 160 + 1 \times 2) / 64 \text{ kbps} \\
&= 0.16440 \text{ ms}
\end{aligned}
$$

In order not to interrupt the data after rate conversion due to this delay at the receiving end, a corresponding amount is offset using the buffer or the like. The sum 0.41077 ms of the offset (0.16440 ms) and one symbol time (0.24637 ms) constituting the processing delay of the discrete Fourier transform unit (DFT) in the receiving unit is determined as the receiving delay.

For the transmission rate of 64 kbps, therefore, the sum 2.25836 ms of the transmission delay time (1.84759 ms) and the receiving delay time (0.41077 ms) makes up the maximum delay time in the transmission and receiving units, so that the delay can be suppressed to less than or equal to 2.5 ms constituting one period of ISDN.

This embodiment has been explained with reference to the transmission rate of 64 kbps. The delay time can be suppressed in similar fashion also for other transmission rates. Further, according to this embodiment, the example of calculation has been explained assuming that the number of bits of bit map B is two. Nevertheless, a similar effect can be accomplished by taking other values as the number of bits of the bit map B.

For example, in the example of calculation shown in the aforementioned embodiment, the bit map A has 44 bits for the conventional single bit map with the data rate of 64 kbps. In the bit assignment according to the present invention described above (hereinafter referred to as the low transmission delay mode), however, 54 bits are required for the bit map A as described with reference to the foregoing embodiment.

Figure 13:
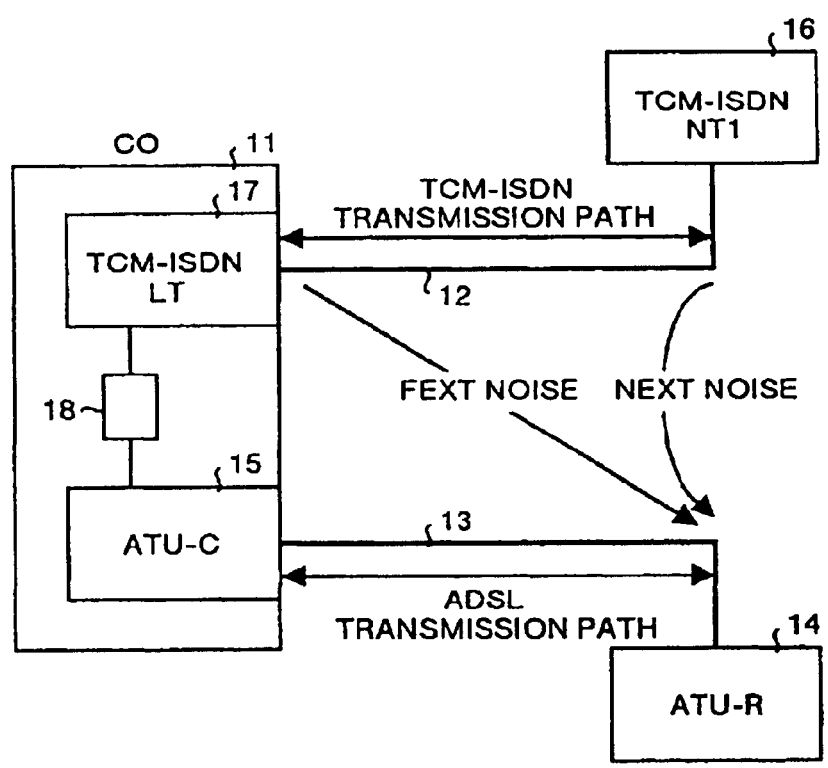
FIG. 13 is a diagram for explaining the behavior of interference noises between the transmission lines.

For transmitting all the bits of the bit map A as effective ones, for example, the low transmission delay mode requires the ADSL transmission path 13 (FIG. 13) having the data transmission capacity of 54 bits×126 (number of bit maps A in hyperframe)/85 ms=80 kbps.

Among the data of about 80 kbps, however, the actual effective transmission data is 64 kbps, and therefore 80 kbps−64 kbps=16 kbps is a transmission loss in the ADSL transmission path 13.

In the mode (hereinafter referred to as the normal mode) other than the low transmission delay mode, however, the bit map A has 44 bits, and therefore the data transmission capacity of 44 bits×126 (number of bit maps A in hyperframe)/85 ms=65 kbps is required and therefore the transmission loss shall be 65 kbps−64 kbps=1 kbps.

Thus, the transmission loss is less than the same in the low transmission delay mode.

As described above, the low transmission delay mode with a small delay is accompanied by a large transmission loss. Depending on the transmission data type, however, the reduction of the transmission loss may be desired in preference to suppressing the delay time. In this embodiment, an example will be explained in which the data to be reduced in delay time coexists with the data to be reduced in transmission loss and in which an efficient transmission is achieved by combining the low transmission delay mode and the normal mode.

Figure 14:
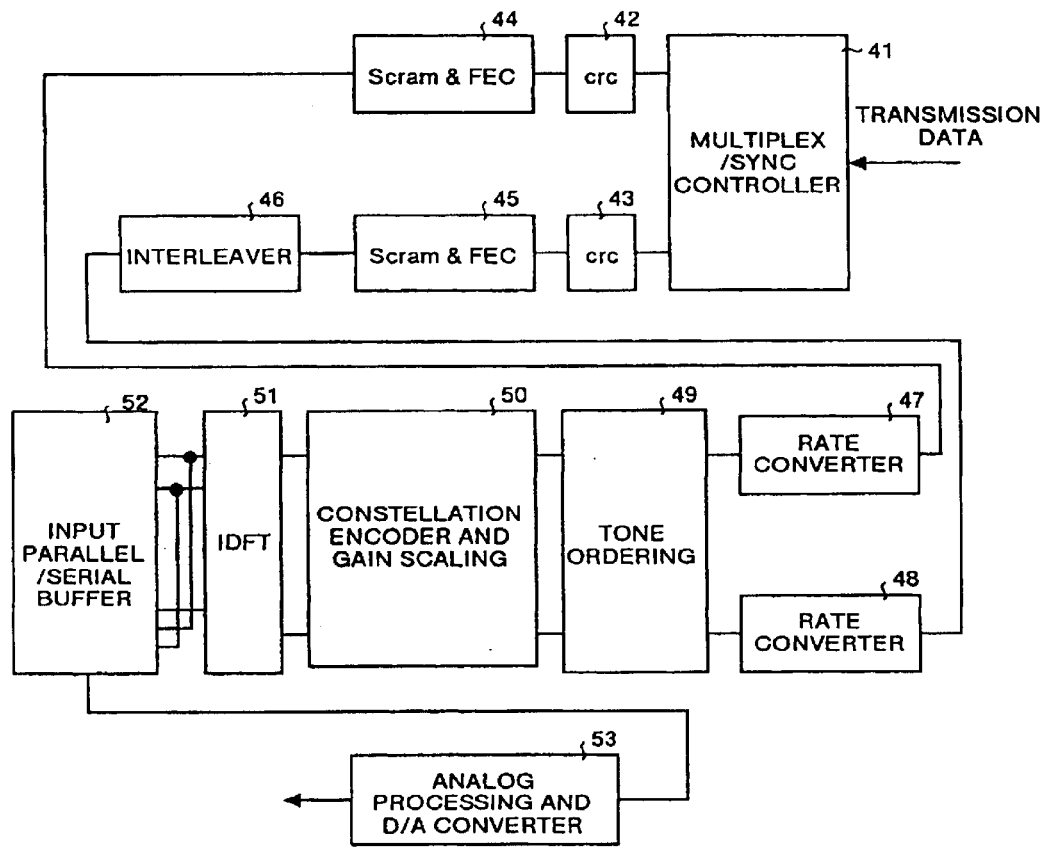
FIG. 14 is a diagram explaining the transmission function of the ADSL office equipment.

With the ADSL office equipment shown in FIG. 14, there are two routes available from the multiplex/sync controller 41 to the tone ordering unit 49. One is a interleaved data buffer route including the interleaver 46, and the other is a fast data buffer route not including the interleaver 46.

Figure 15:
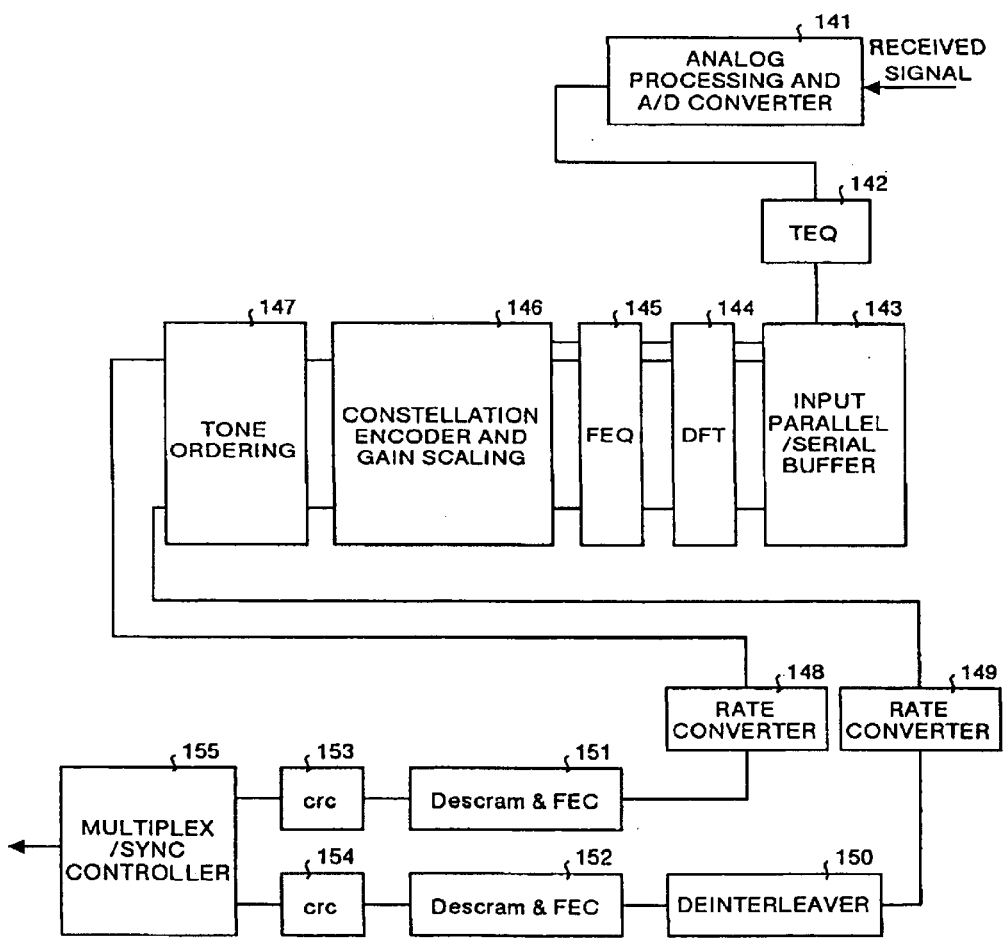
FIG. 15 is a diagram explaining the receiving function of the ADSL terminal equipment.
Figure 16:
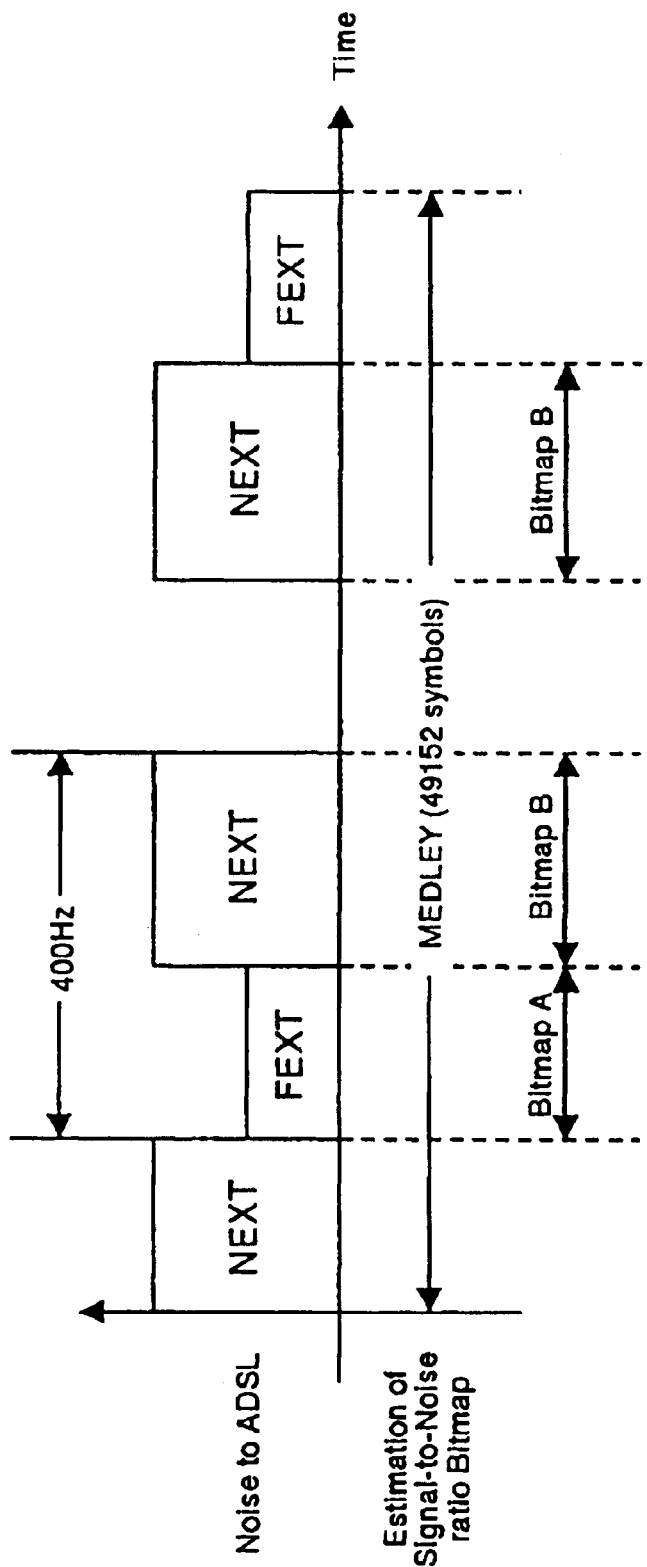
FIG. 16 is a diagram for explaining a dual bit map according to the prior art.
Figure 17:
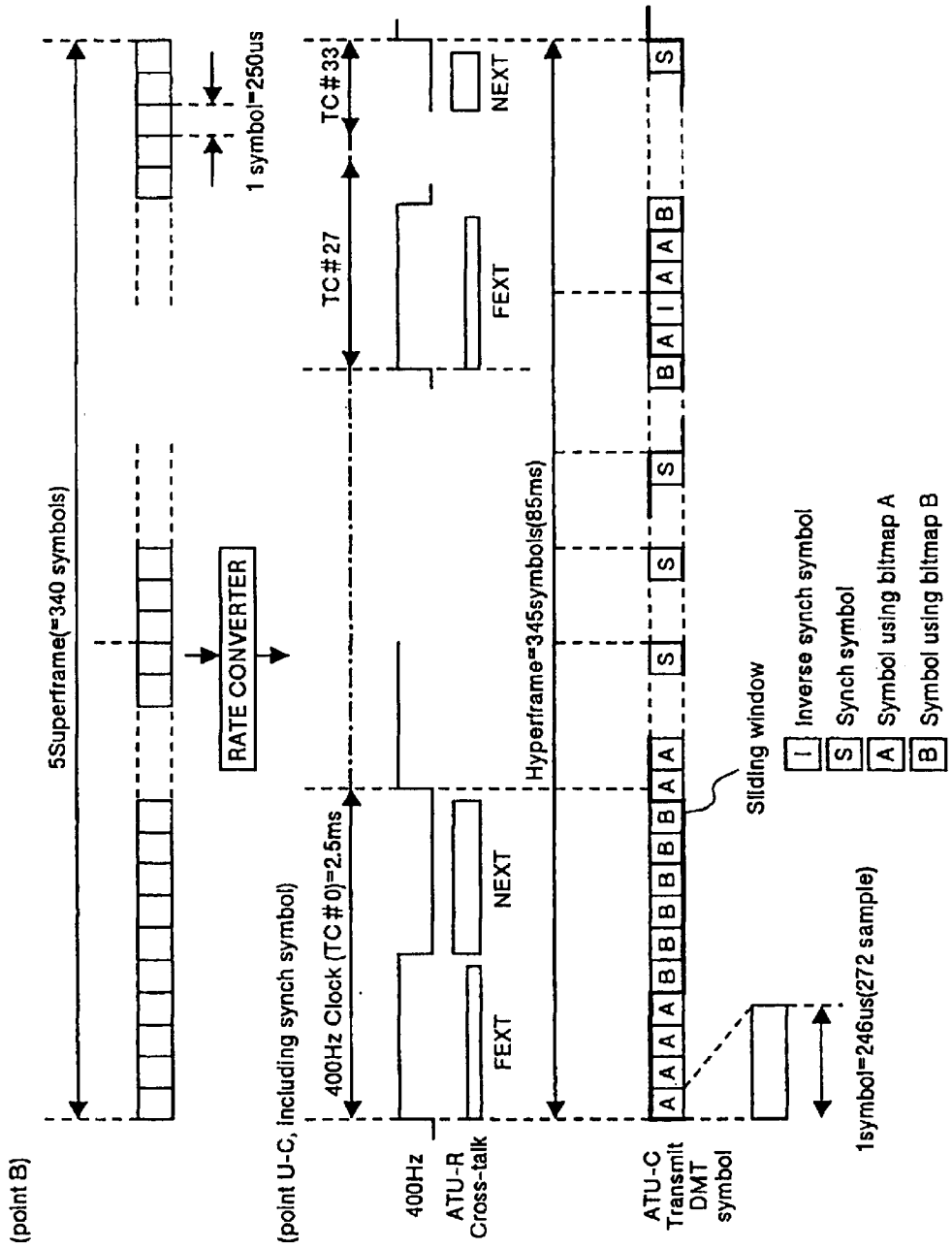
FIG. 17 is a diagram for explaining the bit map assignment according to the prior art.

Similarly, the ADSL terminal equipment shown in FIG. 15 also has two routes. This configuration makes it possible to use the interleaved route and the non-interleaved route for different purposes.

In transmitting data from the ADSL office equipment to the ADSL terminal equipment, how to transmit the data is determined by the initialization process. An example of the table transmitted for initialization is shown in FIG. 7. In FIG. 7, $m_{12}$, $m_{13}$ are accompanied by the description "Reserved for future use". In this embodiment, however, this portion is used as a flag indicating which one of the low transmission delay mode and the normal mode is selected, in the fast data buffer route and the interleaved data buffer route, as shown in FIG. 8. $m_{12}$, $m_{13}$ are defined as follows.

When $m_{12}=0$, the fast data buffer route is processed in normal mode.

When $m_{12}=1$, the fast data buffer route is processed in low transmission delay mode.

When $m_{13}=0$, the interleaved data buffer route is processed in normal mode.

When $m_{13}=1$, the interleaved data buffer route is processed in low transmission delay mode.

Figure 9:
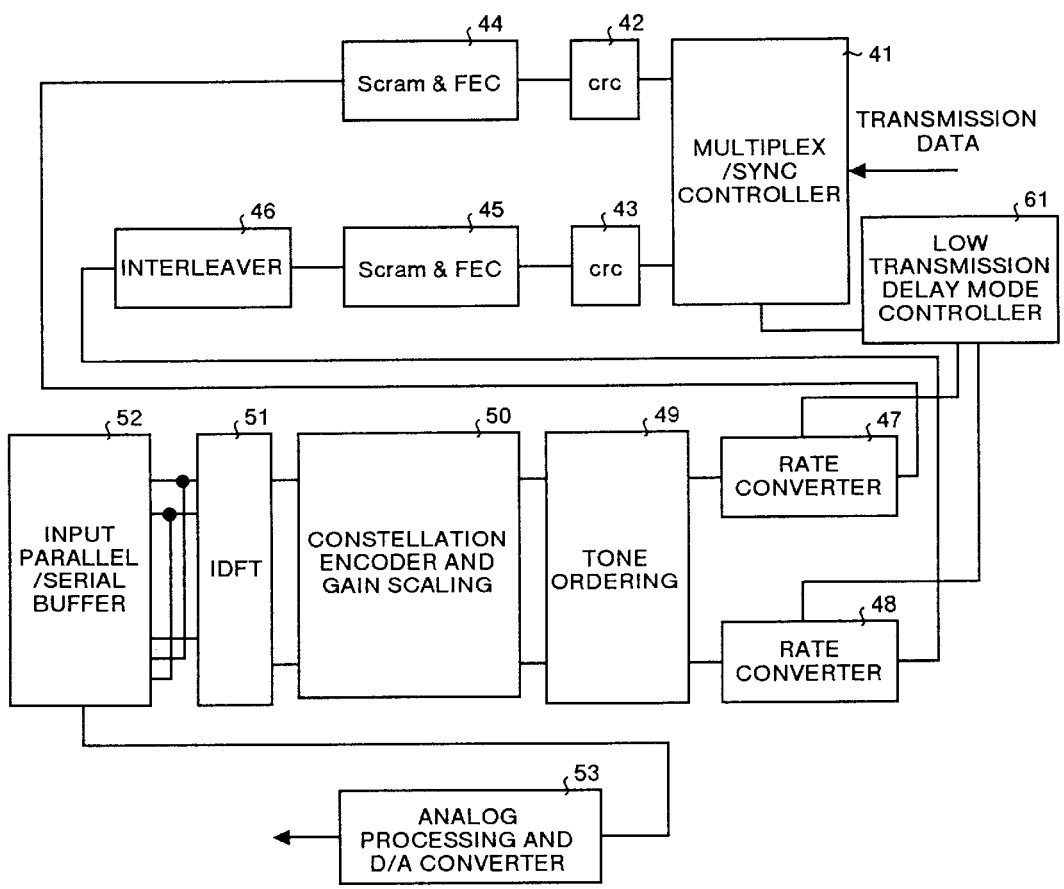
FIG. 9 is a diagram explaining the transmission function of the ADSL office equipment according to the present invention.
Figure 10:
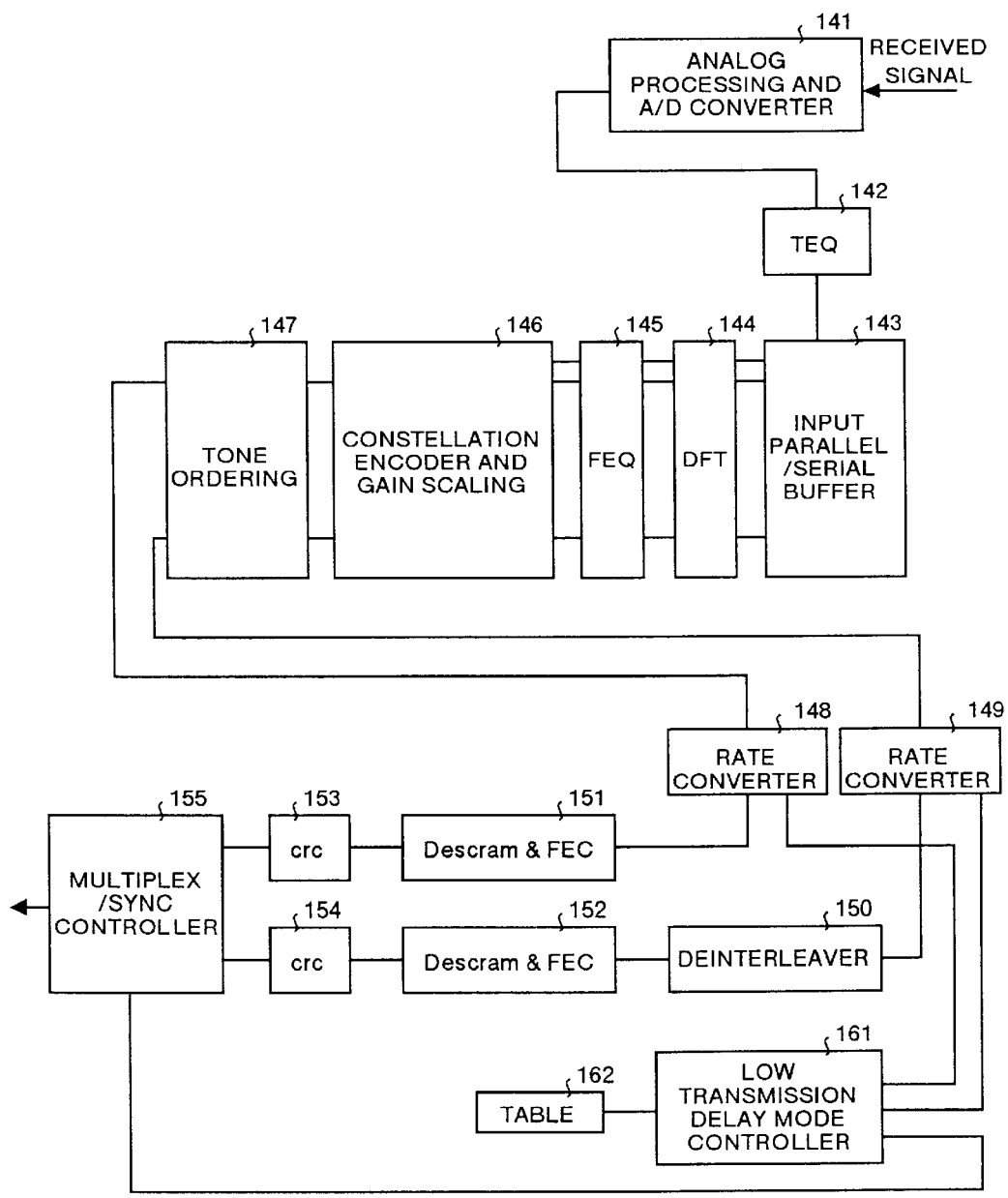
FIG. 10 is a diagram explaining the receiving function of the ADSL terminal equipment according to the present invention.

With reference to FIGS. 9 and 10, an explanation will be given of the operation performed in the case where a request is received from a high-level layer to transmit the data of the audio system affected by the transmission delay through the fast data buffer route in low transmission delay mode and to transmit the internet data emphasizing the data transmission rate more than the delay through the interleaved data buffer route in normal mode, for example. FIG. 9 is a diagram showing a functional configuration of the transmission system of the ADSL office equipment, and FIG. 10 is a diagram showing a functional configuration of the receiving system of the ADSL terminal equipment. In FIG. 9, numeral 61 designates low transmission delay mode controller for controlling the selection of the fast data buffer route and the interleaved data buffer route and the low transmission delay mode. In FIG. 10, numeral 161 designates low transmission delay mode controller for controlling the selection of the fast data buffer route and the interleaved data buffer route and the low transmission delay mode, and numeral 162 designates a table delivered between the transmitting and receiving ends for initialization.

Assume that the ADSL office equipment 15 has received a request from a high-level layer to transmit the audio data through the fast data buffer route in low transmission delay mode and to transmit the internet data through the interleaved buffer route in normal mode. First, $m_{12}$ is initialized to 1 and $m_{13}$ is initialized to 0. The table as shown in FIG. 8 is then transmitted to the ADSL terminal equipment 14. The contents of the transmitted table is reflected in the table 162 of the ADSL terminal equipment 14 (FIG. 10).

Then, in the ADSL office equipment 15, the low transmission delay mode controller 61 (FIG. 9) controls the operation in such a manner as to transmit the audio data through the fast data buffer route and the internet data through the interleaved data buffer route. Thus, the audio data is transmitted to the rate converter 47 through the cyclic redundancy check unit 42 and the scramble and forward error correction unit 44, while the internet data is transmitted to the rate converter 48 through the cyclic redundancy check unit 43, the scramble and forward error correction unit 45 and the interleaver 46.

In this process, the low transmission delay mode controller 61 controls the rate converters 47, 48 in such a manner as to process the audio data in low transmission delay mode and the internet data in normal mode. In accordance with this control operation, the rate converters 47, 48 process and transmit the received data. After that, the received data are transmitted to the ADSL terminal equipment 14 through the tone ordering unit 49, the analog processing and D/A converter 53 and the ADSL transmission path 13.

In the ADSL terminal equipment 14 that has received the audio data and the internet data, on the other hand, the low transmission delay mode controller 161 performs the control operation, with reference to the table 162 (FIG. 10) reflecting the contents transmitted at the time of initialization, in such a manner as to transmit the audio data through the fast data buffer route and the internet data through the interleaved data buffer route. The audio data is transmitted to the rate converter 148 and the internet data is transmitted to the rate converter 149, through the discrete Fourier transform unit 144, etc.

Because $m_{12}$ is set to 1 and $m_{13}$ is set to 0, the low transmission delay controller 161 controls the rate converters 148, 149 in such a manner as to process the audio data in low transmission delay mode and the internet data in normal mode. In accordance with this control operation, the rate converters 148, 149 process and transmit the data.

After that, the audio data is transmitted through the descramble and forward error correction unit 151, the cyclic redundancy check unit 153 and the multiplex/sync controller 155, while the internet data is transmitted through the deinterleaver 150, the descramble and forward error correction unit 152, the cyclic redundancy check unit 154 and the multiplex/sync controller 155.

As described above, in the case where the audio data and the internet data are transmitted in coexistence for communication, the mode of transmission of the audio data and the internet data is switched between the low transmission delay mode and the normal mode. Thus, the audio data can be transmitted utilizing a communication method having a lower transmission delay, while the internet data can be transmitted utilizing a communication method having a lower transmission loss. In this way, the disadvantage of the transmission loss in low transmission delay mode can be reduced to the minimum.

An example is explained below in which the transmission loss is compared between the case where all the data are transmitted in low transmission delay mode and the case where the mode is switched between the low transmission delay mode the normal mode appropriately.

Suppose an ordinary home environment where one ISDN telephone (64 kbps) or equivalent and one internet access unit (512 kbps) are used at the same time.

.When all the transmission data of 576 kbps (64 kbps for telephone plus 512 kbps for the internet) is transmitted in low transmission delay mode:

The number of bits of the ten DMT symbols before rate conversion will be 576 kbps×2.5 ms=1440 bits.

The number of bits of the bit map A in low transmission delay mode will be 1440 bits/3=480 bits.

In this case, the total number of bits of the hyperframe is 480 bits×126=60480 bits.

The required data transmission capacity will be 60480 bits/85 ms=711.5 kbps.

Thus, the transmission loss will be 711.5 kbps−576 kbps=135.5 kbps.

The transmission loss in terms of the ratio to the entire transfer rate is expressed as 135.5 kbps/576 kbps=23.5%.

.When the telephone data of 64 kbps is transmitted in low transmission delay mode and the internet data of 521 kbps is transmitted in normal mode:

For transmitting all the bits of the bit map A (assumed to be 54 bits, for example, as determined in the preceding embodiment) as effective bits, the data transmission capacity of 54 bits×126 (number of bit maps A in hyperframe)/85 ms=80 kbps is required of the ADSL transmission path 13 in low transmission delay mode, of which the effective transmission data is actually 64 kbps, and therefore the transmission loss will be 80 kbps−64 kbps=16 kbps.

Thus the transmission loss in terms of the ratio to the entire transfer rate will be 16 kbps/(64 kbps+521 kbps)=3%.

It is thus seen that the ratio (=3%) of the transmission loss to the transfer rate of all the transmission data in the case where the low transmission delay mode and the normal mode are switched for use as described above is overwhelmingly small as compared with the ratio (=23.5%) of the transmission loss in the case where all the data are transmitted in low transmission delay mode.

Also, in the case where a STM (synchronous transfer mode) interface is included as a backbone of the network, the above-mentioned operation is performed between the ADSL terminal equipment and the ADSL office equipment, while the data are transmitted from the ADSL terminal equipment to the ADSL office equipment to the STM network to the ADSL office equipment to the ADSL terminal equipment.

Figure 11:
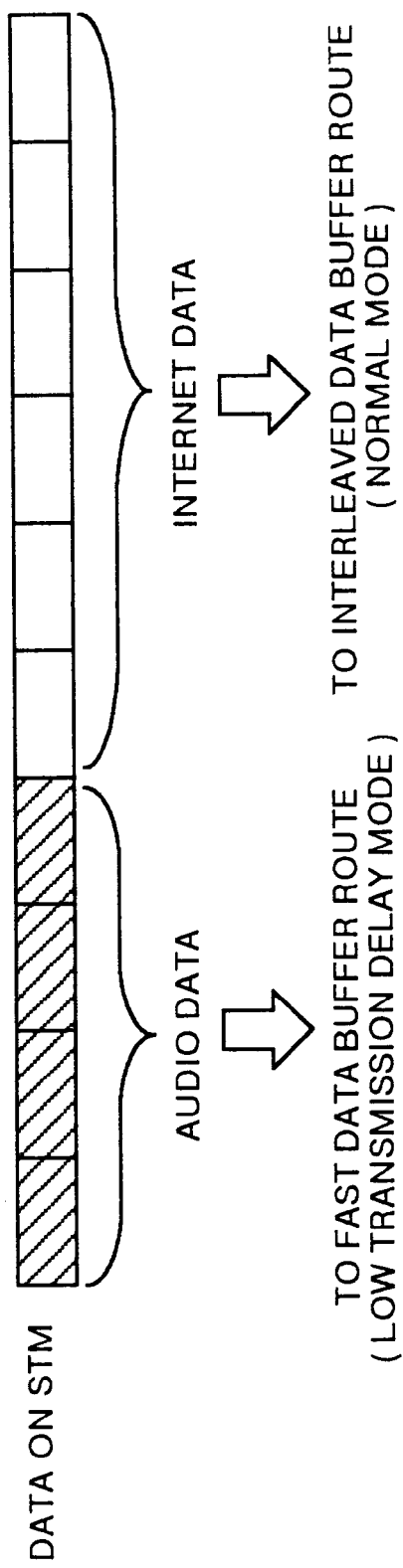
FIG. 11 is a slot configuration diagram showing the data delivered between the ADSL office equipment according to the present invention.
Figure 12:
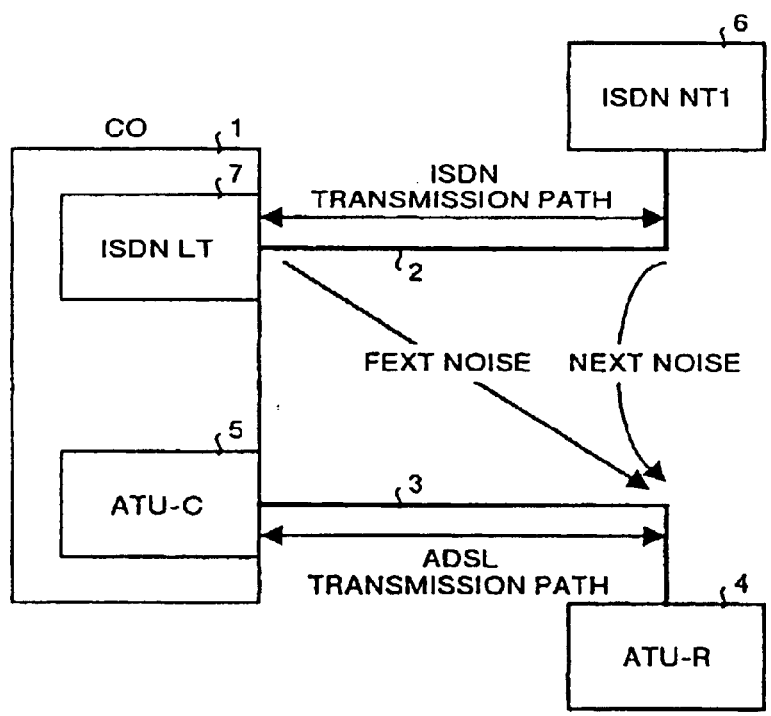
FIG. 12 is a diagram for explaining the behavior of interference noises between the transmission lines.

Further, during the communication between the ADSL office equipment through the STM network, as shown in FIG. 11, data are supplied in time series in units of ten slots. The low transmission delay mode controller 61 (FIG. 9), 161 (FIG. 10) have the control function of transmitting and receiving such data, the function of synchronizing the timing and detecting the position thereof to predetermine the slots storing the audio data and the internet data. Further, they also have the function of, based on the detection, selecting the data route and controlling the route for low transmission delay mode or for normal mode, thus controlling the data transmission in accordance with the table prepared by the initialization or the instruction from a high-level layer.

This embodiment uses $m_{12}$, $m_{13}$ in the table of initialization steps as a flag for selecting the low transmission delay mode or normal mode. However, a similar effect is obtained by using other portions. Further, a similar effect can be produced by employing other methods of selection such as attaching a flag to the data.

Although this embodiment refers to the case in which a request is received from a high-level layer about which one of the low transmission delay mode and the normal mode is to be selected, a similar effect can be obtained by making possible an automatic selection depending upon the type of data such as audio data or image data.

In this embodiment, the environment is supposed in which one ISDN telephone (64 kbps) or its equivalent and one internet access unit (521 kbps) are used at the same time. Instead, the use of other applications or other transmission rates can produce a similar effect. Further, instead of using single bit map for calculation as explained in this embodiment, a similar effect can be obtained by use of the dual bit map.

Further, the foregoing description refers to the case in which the audio data is transmitted through the fast data buffer route and processed in the low transmission delay mode while the internet data is transmitted through the interleaved data buffer route and processed in the normal mode. The selection of the route and the processing mode according to the data type are not limited to this.

Further, the functions explained above with reference to the diagram of the functional configurations can be realized either by H/W or S/W.

As described above, the present invention provides a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time of one period, and wherein dummy bits are assigned to the portion of the data transmission time to which the data to be transmitted has not assigned, thereby making it possible to suppress the transmission delay within a predetermined period.

Further, the present invention provides a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time and the quasi-data transmission time of one period, and wherein dummy bits are assigned to the portion of the data transmission time and the portion of the quasi-data transmission time to which the data to be transmitted has not assigned, thereby making it possible to suppress the transmission delay within a predetermined period.

Further, the present invention provides a communication system for appropriately selecting a low transmission delay mode in which bits are assigned in such a manner that the data of a given period is transmitted during the data transmission time of one period and dummy bits are assigned to the portion of the data transmission time to which the data to be transmitted has not assigned, or a normal mode in which the data to be transmitted are assigned uniformly over the data transmission time, so that the bits for the data to be transmitted are assigned in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication system for appropriately selecting a low transmission delay mode in which the data of a given period are assigned to the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that bits for the data to be transmitted are assigned in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein all the data of a given period are reproduced based on the portion of the received data assigned to the data transmission time of one period, thereby making it possible to suppress the transmission delay within a predetermined period.

Further, the present invention provides a communication system for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, and wherein all the data of one period are reproduced based on the portion of the received data assigned to the data transmission time and the quasi-data transmission time of one period, thereby making it possible to suppress the transmission delay within a predetermined period.

Further, the present invention provides a communication system for appropriately selecting a low transmission delay mode in which bits are assigned in such a manner that the data of a given period can be transmitted during the data transmission time of one period and dummy bits are assigned to the portion of the data transmission time to which the data to be transmitted has not assigned, or a normal mode in which the data to be transmitted are assigned uniformly over the data transmission time, so that data are reproduced in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication system for appropriately selecting a low transmission delay mode in which bits are assigned in such a manner that the data of a given period can be transmitted during the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that data are reproduced in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time of one period, and wherein dummy bits are assigned to the portion of the data transmission time to which the data to be transmitted has not assigned, thereby making it possible to suppress the transmission delay within a predetermined period.

Further, the present invention provides a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein bits are assigned in such a manner that the data of a given period is transmitted during the data transmission time and the quasi-data transmission time of one period, and wherein dummy bits are assigned to the portion of the data transmission time and the portion of the quasi-data transmission time to which the data to be transmitted has not assigned, thereby making it possible to suppress the transmission delay within a predetermined period.

Further, the present invention provides a communication method for appropriately selecting a low transmission delay mode in which bits are assigned in such a manner that the data of a given period is transmitted during the data transmission time of one period and dummy bits are assigned to the portion of the data transmission time to which the data to be transmitted has not assigned, or a normal mode in which the data to be transmitted are assigned uniformly over the data transmission time, so that the bits for the data to be transmitted are assigned in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication method for appropriately selecting a low transmission delay mode in which the data of a given period are assigned to the data transmission time and the quasi-data transmission time of one period and dummy bits are assigned to the portion of the data transmission time and the quasi-data transmission time to which the data to be transmitted has not assigned, or a normal mode in which the data to be transmitted are assigned uniformly over the data transmission time, so that bits for the data to be transmitted are assigned in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, wherein all the data of a given period are reproduced based on the portion of the received data assigned to the data transmission time of one period, thereby making it possible to suppress the transmission delay within a predetermined period.

Further, the present invention provides a communication method for performing data communication by a discrete multi-tone modem scheme between a plurality of data communication units using the time-division half-duplex communication function, wherein the ratio between the data transmission time suitable for data transmission and the quasi-data transmission time other than the data transmission time within one period changes dynamically, and wherein all the data of one period are reproduced based on the portion of the received data assigned to the data transmission time and the quasi-data transmission time of one period, thereby making it possible to suppress the transmission delay within a predetermined period.

Further, the present invention provides a communication method for appropriately selecting a low transmission delay mode in which bits are assigned in such a manner that the data of a given period can be transmitted during the data transmission time of one period and dummy bits are assigned to the portion of the data transmission time to which the data to be transmitted has not assigned, or a normal mode in which the data to be transmitted are assigned uniformly over the data transmission time, so that data are reproduced in accordance with the selected mode. In this way, the data affected by the delay and the data not affected by the delay are recognized, and the mode suitable for each data is selected, thereby realizing the optimization of the transmission delay and the transmission loss.

Further, the present invention provides a communication method for appropriately selecting a low transmission delay mode in which bits are assigned in such a manner that the data of a given period can be transmitted during the data transmission time and the quasi-data transmission time of one period and dummy bits are assigned to the portion of the data transmission time and the quasi-data transmission time to which the data to be transmitted has not been assigned, or a normal mode in which the data to be transmitted are assigned uniformly over the data transmission time, so that data are reproduced in accordance with the selected mode. In this way, the data affected by the delay and the data not affected by the delay are recognized, and the mode suitable for each data is selected, thereby realizing the optimization of the transmission delay and the transmission loss.

INDUSTRIAL APPLICABILITY

As described above, the communication system and the communication method according to the present invention are suitable for the data communication performed by the discrete multi-tone modem scheme between a plurality of data communication units through the telephone line.

What is claimed is:

1. A communication system which performs data communication by a discrete multi-tone modem scheme and configures a far-end crosstalk (FEXT) period and a near-end crosstalk (NEXT) period within a subframe in accordance with a transmission timing of a time-division half-duplex communication system,
   characterized in that bits are assigned in such a manner that the data for the subframe is transmitted during the data transmission time of the FEXT period, and wherein dummy bits are assigned to the tail portion of the data transmission time of the FEXT period to which the data to be transmitted has not been assigned.

2. A communication system which performs data communication by a discrete multi-tone modem scheme and configures a far-end crosstalk (FEXT) period and a near-end crosstalk (NEXT) period within a subframe in accordance with a transmission timing of a time-division half-duplex communication system,
   characterized in that bits are assigned in such a manner that the data for the subframe is transmitted during the data transmission time of the FEXT period and the quasi-data transmission time corresponding to the NEXT period, and wherein dummy bits are assigned to the tail portion of the quasi-data transmission time to which the data to be transmitted has not been assigned.

3. The communication system according to claim 1, characterized by appropriately selecting a low transmission delay mode in which bits are assigned in such a manner that the data for the subframe is transmitted during the data transmission time of the FEXT period and dummy bits are assigned to the tail portion of the data transmission time to which the data to be transmitted has not been assigned, or a normal mode in which the data to be transmitted are assigned uniformly over the data transmission time, and the bits for the data to be transmitted are assigned in accordance with the selected mode.

4. The communication system according to claim 2, characterized by appropriately selecting a low transmission delay mode in which the data for the subframe are assigned to the data transmission time and the quasi-data transmission time corresponding to the NEXT period and dummy bits are assigned to the tail portion of the quasi-data transmission time to which the data to be transmitted has not been assigned, or a normal mode in which the data to be transmitted are assigned uniformly over the data transmission time, and bits for the data to be transmitted are assigned in accordance with the selected mode.

5. A communication system which performs data communication by a discrete multi-tone modem scheme and configures a far-end crosstalk (FEXT) period and a near-end crosstalk (NEXT) period within a subframe in accordance with a transmission timing of a time-division half-duplex communication system, characterized by
   reproducing all the data for a given period for the subframe by reproducing received data assigned to the data transmission time of the FEXT period and discarding dummy bits inserted in each subframe.

6. A communication system which performs data communication by a discrete multi-tone modem scheme and configures a far-end crosstalk (FEXT) period and a near-end crosstalk (NEXT) period within a subframe in accordance with a transmission timing of a time-division half-duplex communication system, characterized by
   reproducing all the data for the subframe by reproducing received data assigned to the data transmission time of the FEXT period and the quasi-data transmission time corresponding to the NEXT period and discarding dummy bits inserted in each subframe.

7. The communication system according to claim 5, characterized by appropriately selecting a low transmission delay mode in which bits are assigned in such a manner that the data for the subframe can be transmitted during the data transmission time of the FEXT period and dummy bits are assigned to the tail portion of the data transmission time of the FEXT period to which the data to be transmitted has not been assigned, or a normal mode in which the data to be transmitted are assigned uniformly over the data transmission time, and data are reproduced in accordance with the selected mode.

8. The communication system according to claim 6, characterized by appropriately selecting a low transmission delay mode in which bits are assigned in such a manner that the data for the subframe can be transmitted during the data transmission time of the FEXT period and the quasi-data transmission time corresponding to the NEXT period and dummy bits are assigned to the tail portion of the quasi-data transmission time to which the data to be transmitted has not been assigned, or a normal mode in which the data to be transmitted are assigned uniformly over the data transmission time, and data are reproduced in accordance with the selected mode.

9. A communication method of performing data communication by a discrete multi-tone modem scheme and configuring a far-end crosstalk (FEXT) period and a near-end crosstalk (NEXT) period within a subframe in accordance with a transmission timing of a time-division half-duplex communication system, characterized in that bits are assigned in such a manner that the data for the subframe is transmitted during the data transmission time of FEXT period, and wherein dummy bits are assigned to the tail portion of the data transmission time of the FEXT period to which the data to be transmitted has not been assigned.

10. A communication method of performing data communication by a discrete multi-tone modem scheme and configuring a far-end crosstalk (FEXT) period and a near-end crosstalk (NEXT) period within a subframe in accordance with a transmission timing of a time-division half-duplex communication system, characterized in that bits are assigned in such a manner that the data for the subframe is transmitted during the data transmission time of the FEXT period and the quasi-data transmission time corresponding to the NEXT period, and wherein dummy bits are assigned to the tail portion of the quasi-data transmission time to which the data to be transmitted has not been assigned.

11. The communication method according to claim 9, characterized by appropriately selecting a low transmission delay mode in which bits are assigned in such a manner that the data for the subframe is transmitted during the data transmission time of the FEXT period and dummy bits are assigned to the tail portion of the data transmission time of the FEXT period to which the data to be transmitted has not been assigned, or a normal mode in which the data to be transmitted are assigned uniformly over the data transmission time, and the bits for the data to be transmitted are assigned in accordance with the selected mode.

12. The communication method according to claim 10, characterized by appropriately selecting a low transmission delay mode in which the data for the subframe are assigned to the data transmission time of the FEXT period and the quasi-data transmission time corresponding to the NEXT period and dummy bits are assigned to the tail portion of the quasi-data transmission time to which the data to be transmitted has not been assigned, or a normal mode in which the data to be transmitted are assigned uniformly over the data transmission time, and bits for the data to be transmitted are assigned in accordance with the selected mode.

13. A communication method of performing data communication by a discrete multi-tone modem scheme and configuring a far-end crosstalk (FEXT) period and a near-end crosstalk (NEXT) period within a subframe in accordance with a transmission timing of a time-division half-duplex communication system, characterized by
reproducing all the data for the subframe by reproducing received data assigned to the data transmission time of the FEXT period and discarding dummy bits inserted in each data transmission time of the FEXT period.

14. A communication method of performing data communication by a discrete multi-tone modem scheme and configuring a far-end crosstalk (FEXT) period and a near-end crosstalk (NEXT) period within a subframe in accordance with a transmission timing of a time-division half-duplex communication system, characterized by
reproducing all the data for the subframe by reproducing received data assigned to the data transmission time of the FEXT period and the quasi-data transmission time corresponding to the NEXT period and discarding dummy bits inserted in each quasi-data transmission time corresponding to the NEXT period.

15. The communication method according to claim 13, characterized by appropriately selecting a low transmission delay mode in which bits are assigned in such a manner that the data for the subframe can be transmitted during the data transmission time of the FEXT period and dummy bits are assigned to the tail portion of the data transmission time of the FEXT period to which the data to be transmitted has not been assigned, or a normal mode in which the data to be transmitted are assigned uniformly over the data transmission time, and data are reproduced in accordance with the selected mode.

16. The communication method according to claim 14, characterized by appropriately selecting a low transmission delay mode in which bits are assigned in such a manner that the data for the subframe can be transmitted during the data transmission time of the FEXT period and the quasi-data transmission time corresponding to the NEXT period and dummy bits are assigned to the tail portion of the quasi-data transmission time to which the data to be transmitted has not been assigned, or a normal mode in which the data to be transmitted are assigned uniformly over the data transmission time, and data are reproduced in accordance with the selected mode.

17. A transmission device in a communication system utilizing discrete multi-tone modulation, the transmitting device comprising:
means for receiving a number (D) of data bits corresponding to a subframe, the subframe including a data transmission time and a quasi-data transmission time that are determined based on a transmission timing of a time-division half-duplex communication system, the data transmission time being within a far-end crosstalk (FEXT) period for the subframe; and
means for assigning a number (T) of transmission bits to be transmitted during the data transmission time of the FEXT period over the data transmission path, T being greater than D,
wherein the received data bits are assigned as the first D transmission bits to be transmitted during the data transmission time, and dummy bits are assigned as the next (T–D) transmission bits to be transmitted during the data transmission time of the FEXT period.

18. The transmission device according to claim 17, wherein the transmission device is operable to be controlled remotely to recognize a timing of FEXT noise generated in the data transmission path.

19. The transmission device according to claim 17, wherein the
the means for receiving is operable to receive the data bits at a uniform rate.

20. A transmission device in a communication system utilizing discrete multi-tone modulation, the transmitting device comprising:
means for receiving a number (D) of data bits corresponding to a subframe, the subframe including a data transmission time and a quasi-data transmission time that are determined based on a transmission timing of a time-division half-duplex communication system, the data transmission time being within a far-end crosstalk (FEXT) period for the subframe; and means for assigning a number (T) of transmission bits to be transmitted during the data and quasi-data transmission times over the data transmission path, T being greater than D, wherein the received data bits are assigned as the first D transmission bits to be transmitted during the data and quasi-data transmission times, and dummy bits are assigned as the next (T–D) transmission bits to be transmitted during the data and quasi-data transmission times.

21. The transmission device according to claim 20, wherein the means for assigning is operable to assign a first number (T1) of transmission bits to be transmitted during the data transmission time, and assign a second number (T2) of transmission bits to be transmitted during the quasi-data transmission time, T1 being greater than T2.

22. The transmission device according to claim 21, wherein the data transmission time is determined as a time within the subframe corresponding to the generation of far-end crosstalk (FEXT) noise in the data transmission path; and the quasi-data transmission time is determined as a time within the subframe corresponding to the generation of near-end crosstalk (NEXT) noise in the data transmission path.

23. The transmission device according to claim 20, wherein the the means for receiving is operable to receive the data bits at a uniform rate.

* * * * *